(12) United States Patent
Suzuki et al.

(10) Patent No.: US 11,394,941 B2
(45) Date of Patent: Jul. 19, 2022

(54) IMAGE PROCESSING DEVICE AND IMAGE PROCESSING METHOD

(71) Applicant: SONY CORPORATION, Tokyo (JP)

(72) Inventors: Takaaki Suzuki, Kanagawa (JP); Noriaki Takahashi, Tokyo (JP); Haruka Asai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/049,420

(22) PCT Filed: Mar. 8, 2019

(86) PCT No.: PCT/JP2019/009424
§ 371 (c)(1),
(2) Date: Oct. 21, 2020

(87) PCT Pub. No.: WO2019/230109
PCT Pub. Date: Dec. 5, 2019

(65) Prior Publication Data
US 2021/0368149 A1    Nov. 25, 2021

(30) Foreign Application Priority Data

May 28, 2018  (JP) .............................. JP2018-101546

(51) Int. Cl.
*G06T 5/00* (2006.01)
*H04N 9/31* (2006.01)
*G06T 5/20* (2006.01)

(52) U.S. Cl.
CPC ........... *H04N 9/3194* (2013.01); *G06T 5/003* (2013.01); *G06T 5/20* (2013.01); *G06T 2207/30168* (2013.01)

(58) Field of Classification Search
CPC .. H04N 9/3194; H04N 9/3147; H04N 9/3185; G06T 5/003; G06T 5/20;
(Continued)

(56) References Cited

U.S. PATENT DOCUMENTS 6,222,593 B1 *  4/2001  Higurashi .............. G03B 37/04
                                                     315/368.12
9,955,131 B2 *  4/2018  Fukuda ................ H04N 9/3185
(Continued)

FOREIGN PATENT DOCUMENTS

EP          2385408 A1    11/2011
JP       2002-077956 A     3/2002
(Continued)

*Primary Examiner* — Paulos M Natnael
(74) *Attorney, Agent, or Firm* — Paratus Law Group, PLLC

(57) ABSTRACT

A search is enabled for an adjustment value with which a good blur correction effect is obtained by blur correction processing as an optical adjustment value of an image projection device, and blur correction performance is improved in a case where correction of a focus blur that occurs in a projection image is performed by signal processing. An image processing device according to the present technology includes: a blur correction unit that performs blur correction processing for focus blur correction on an input image on the basis of a blur characteristic that is a characteristic of a focus blur that occurs in a projection image of an image projection device, the blur characteristic being measured in a state where a predetermined candidate value is set as an optical adjustment value of the image projection device; and a use determination unit that performs evaluation regarding the focus blur on a projection image obtained by causing the image projection device to project an image subjected to the blur correction processing, and performs determination regarding whether or not the candidate value is usable on the basis of a result of the evaluation.

14 Claims, 16 Drawing Sheets

(58) Field of Classification Search
CPC .... G06T 2207/30168; G06T 2207/10024; G03B 21/53; G03B 21/00
See application file for complete search history.

(56) References Cited

U.S. PATENT DOCUMENTS

| | | | | |
|---|---|---|---|---|
| 11,069,038 B2* | 7/2021 | Suzuki | ............... | H04N 9/3185 |
| 2007/0092244 A1* | 4/2007 | Pertsel | ............... | H04N 5/2327 |
| | | | | 396/153 |
| 2007/0286514 A1* | 12/2007 | Brown | ............... | H04N 9/3179 |
| | | | | 382/254 |
| 2008/0001916 A1* | 1/2008 | Nozaki | ............... | H04N 9/3194 |
| | | | | 345/156 |
| 2009/0244090 A1 | 10/2009 | Zhang et al. | | |
| 2010/0157127 A1* | 6/2010 | Takayanagi | ........ | H04N 5/23293 |
| | | | | 348/333.02 |
| 2011/0242493 A1 | 10/2011 | Kotani | | |
| 2011/0273674 A1* | 11/2011 | Ishida | ............... | G02B 7/023 |
| | | | | 353/52 |
| 2013/0071028 A1* | 3/2013 | Schiller | ............... | G06T 7/11 |
| | | | | 382/180 |
| 2017/0318270 A1* | 11/2017 | Fukuda | ............... | H04N 9/3185 |
| 2018/0082406 A1* | 3/2018 | Suzuki | ............... | H04N 9/317 |
| 2021/0195153 A1* | 6/2021 | Suzuki | ............... | H04N 9/3194 |
| 2021/0302756 A1* | 9/2021 | Makinen | ............... | H04N 13/322 |

FOREIGN PATENT DOCUMENTS

| | | |
|---|---|---|
| JP | 2006-174184 A | 6/2006 |
| JP | 2009-008974 A | 1/2009 |
| JP | 2009-524849 A | 7/2009 |
| JP | 2011-237482 A | 11/2011 |
| JP | 2017-032891 A | 2/2017 |
| WO | WO 2016/157671 A1 | 10/2016 |
| WO | WO 2017/085802 A1 | 5/2017 |

* cited by examiner

FIG. 6
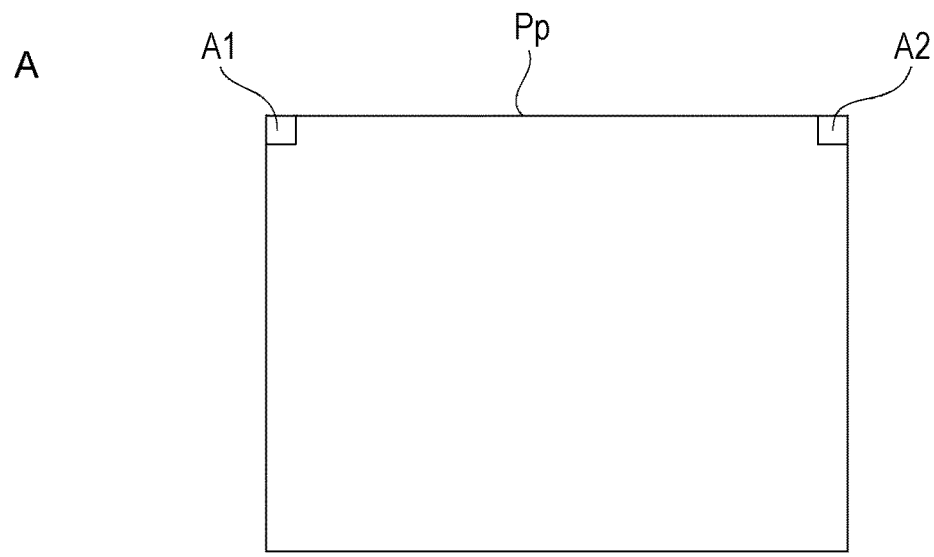
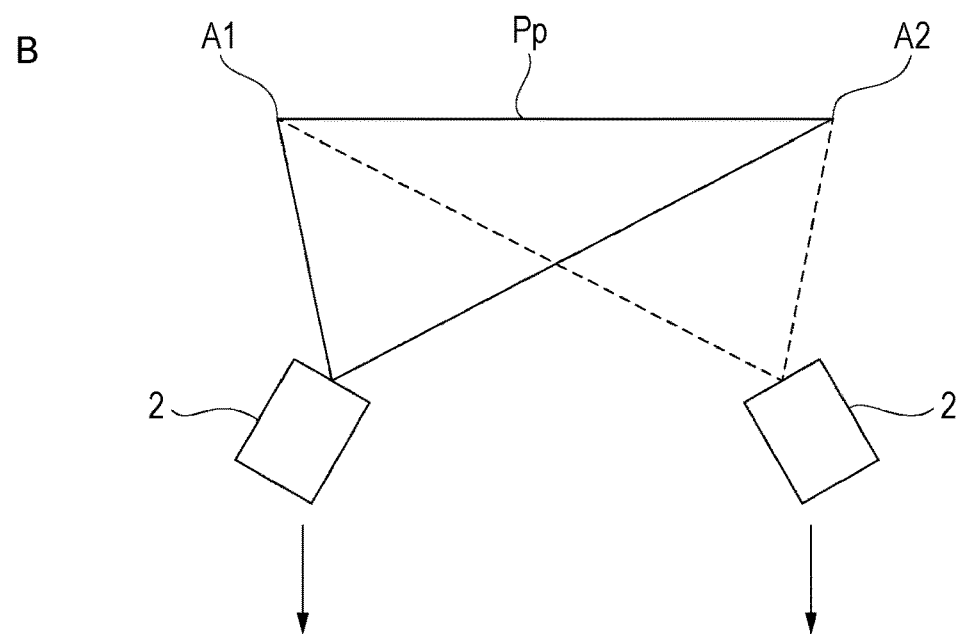
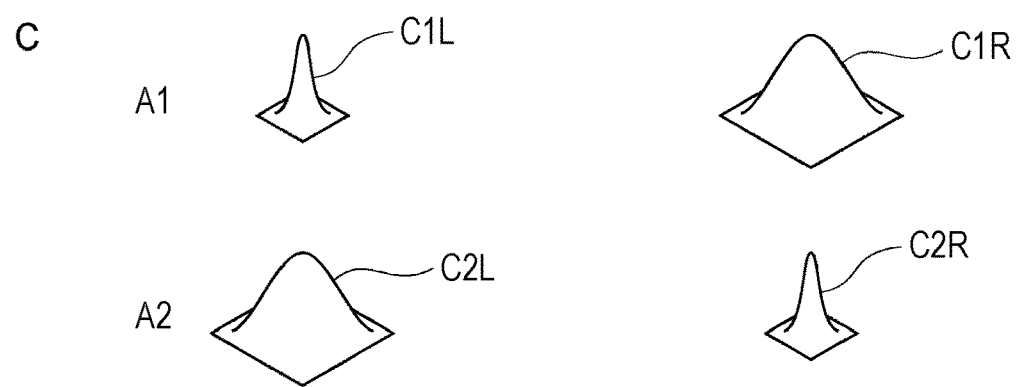

FIG. 9

| | | | CANDIDATE PARAMETER |
|---|---|---|---|
| FIRST SETTING CONDITION | FIRST PROJECTOR | PAN | CANDIDATE 1-1 |
| | | TILT | CANDIDATE 1-1 |
| | | LENS SHIFT | CANDIDATE 1-1 |
| | | FOCUS POSITION | CANDIDATE 1-1 |
| | SECOND PROJECTOR | PAN | CANDIDATE 2-1 |
| | | TILT | CANDIDATE 2-1 |
| | | LENS SHIFT | CANDIDATE 2-1 |
| | | FOCUS POSITION | CANDIDATE 2-1 |
| | ⋮ | ⋮ | ⋮ |
| | n-TH PROJECTOR | PAN | CANDIDATE n-1 |
| | | TILT | CANDIDATE n-1 |
| | | LENS SHIFT | CANDIDATE n-1 |
| | | FOCUS POSITION | CANDIDATE n-1 |
| SECOND SETTING CONDITION | FIRST PROJECTOR | PAN | CANDIDATE 1-2 |
| | | TILT | CANDIDATE 1-2 |
| | | LENS SHIFT | CANDIDATE 1-2 |
| | | FOCUS POSITION | CANDIDATE 1-2 |
| | SECOND PROJECTOR | PAN | CANDIDATE 2-2 |
| | | TILT | CANDIDATE 2-2 |
| | | LENS SHIFT | CANDIDATE 2-2 |
| | | FOCUS POSITION | CANDIDATE 2-2 |
| | ⋮ | ⋮ | ⋮ |
| | n-TH PROJECTOR | PAN | CANDIDATE n-2 |
| | | TILT | CANDIDATE n-2 |
| | | LENS SHIFT | CANDIDATE n-2 |
| | | FOCUS POSITION | CANDIDATE n-2 |
| ⋮ | ⋮ | ⋮ | ⋮ |
| m-TH SETTING CONDITION | FIRST PROJECTOR | PAN | CANDIDATE 1-m |
| | | TILT | CANDIDATE 1-m |
| | | LENS SHIFT | CANDIDATE 1-m |
| | | FOCUS POSITION | CANDIDATE 1-m |
| | SECOND PROJECTOR | PAN | CANDIDATE 2-m |
| | | TILT | CANDIDATE 2-m |
| | | LENS SHIFT | CANDIDATE 2-m |
| | | FOCUS POSITION | CANDIDATE 2-m |
| | ⋮ | ⋮ | ⋮ |
| | n-TH PROJECTOR | PAN | CANDIDATE n-m |
| | | TILT | CANDIDATE n-m |
| | | LENS SHIFT | CANDIDATE n-m |
| | | FOCUS POSITION | CANDIDATE n-m |

FIG. 10
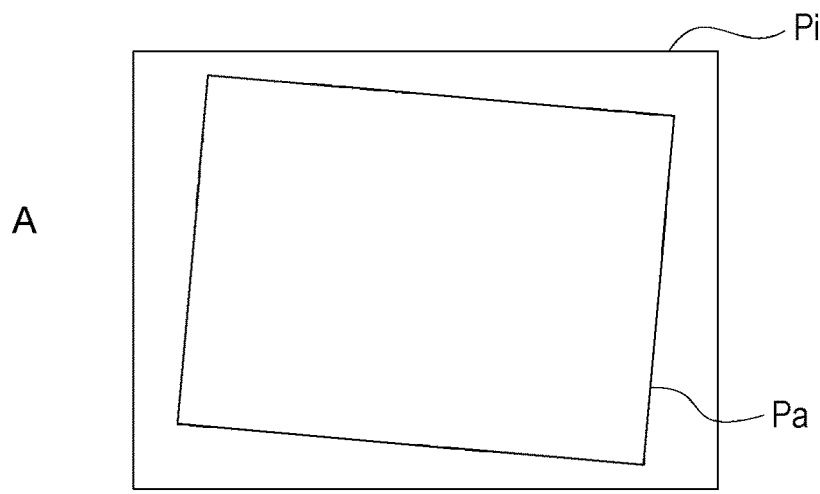
A
B
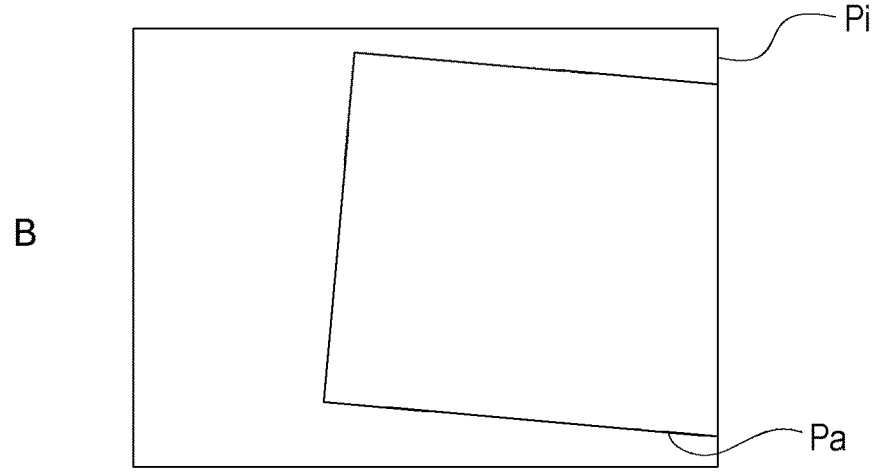
FIG. 11
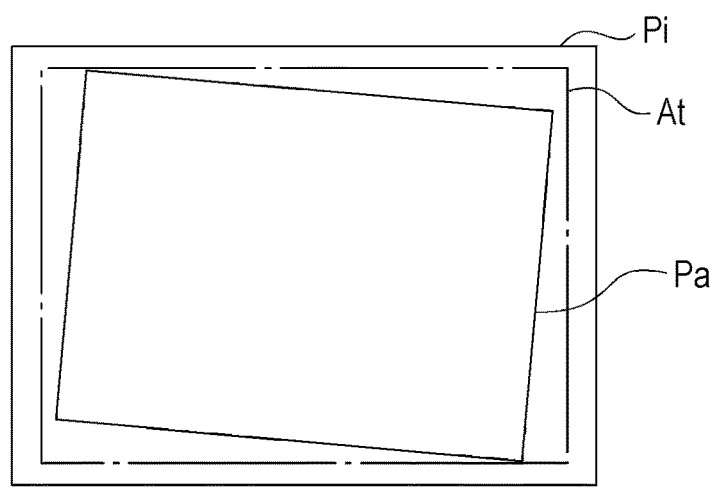

FIG. 14
A
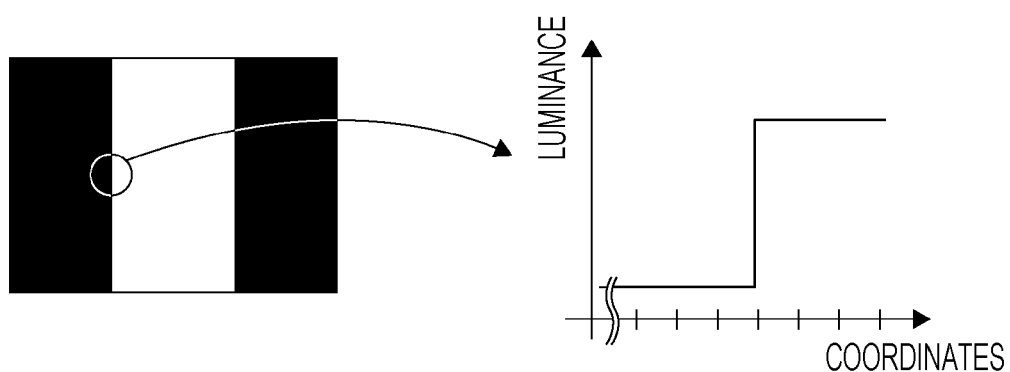
B
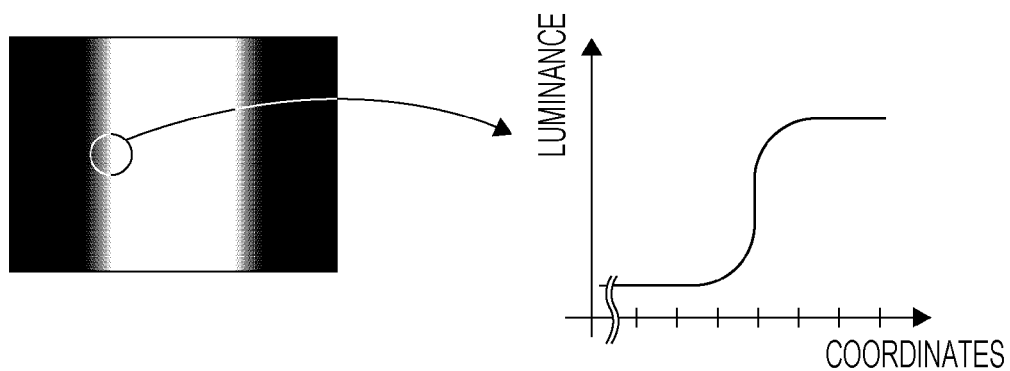

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2019/009424 (filed on Mar. 8, 2019) under 35 U.S.C. § 371, which claims priority to Japanese Patent Application No. 2018-101546 (filed on May 28, 2018), which are all hereby incorporated by reference in their entirety.

TECHNICAL FIELD

The present technology relates to an image processing device and a method thereof, and particularly to a technical field of correcting a focus blur that occurs in a projection image.

BACKGROUND ART

An image projection device that projects and displays an image on a projection target such as a screen is widely known, for example, a liquid crystal projector device. As image projection using such an image projection device, for example, for the purpose of gaining luminance, projection is performed such that a plurality of image projection devices superimposes a target image on the projection target (so-called superimposed projection).

In a case where the superimposed projection is performed, it is difficult to arrange all the image projection devices at appropriate positions with respect to the projection target for convenience of installation. For that reason, an image blur (focus blur) due to focus deviation is likely to occur in a projection image by an image projection device arranged in an inappropriate position at least, and image quality degradation of a superimposed projection image is caused.

In Patent Document 1 below, a feedback type image correction technology is disclosed that sequentially changes a pixel value of an image projected by each image projection device so that a difference decreases between a pixel value of a pixel of a superimposed projection image and a pixel value of a pixel of an input image corresponding to the pixel of the superimposed projection image. By using the correction technology, it becomes possible to correct the focus blur that occurs in the superimposed projection image.

Furthermore, for correction of the focus blur, there is also a method of performing blur correction processing (over-enhancement processing) using a filter designed by an inverse function of a blur on an input image to obtain a blur-corrected image and projecting the blur-corrected image.

CITATION LIST

Patent Document

Patent Document 1: Japanese Patent Application Laid-Open No. 2009-8974

SUMMARY OF THE INVENTION

Problems to be Solved by the Invention

Here, in the case where the superimposed projection is performed, it is necessary to make image projection ranges of the respective image projection devices uniform, and for that purpose, a lens shift mechanism (mechanism for shifting (parallelly moving) a position of a projection image in a direction parallel to a projection plane) is used that is included in the image projection device, or adjustment is performed of an installation angle (rotation angle in a pan or tilt direction) of the image projection device. That is, the image projection range of each image projection device is adjusted by setting of optical adjustment values of the image projection device such as an amount of lens shift by the lens shift mechanism and the rotation angle in the pan or tilt direction of the image projection device.

However, when the optical adjustment values of the image projection device changes, such as the amount of lens shift and the rotation angle in the pan or tilt direction described above, a change also occurs in a characteristic (blur condition) of the focus blur that occurs in the projection image.

Regarding the adjustment of the image projection range described above, there may be a plurality of combinations of the optical adjustment values for making the image projection ranges of the respective image projection devices uniform, but at this time, if a combination of the adjustment values is set that is disadvantageous in view of the characteristic of the focus blur, there is a possibility that image quality cannot be sufficiently improved even if the blur correction by signal processing is performed such as the method using the inverse function of the blur described above.

The present technology has been made in view of the circumstances described above, and an object of the present technology is to enable a search for an adjustment value with which a good blur correction effect is obtained by the blur correction processing as an optical adjustment value of the image projection device, and to improve blur correction performance in a case where the correction of the focus blur that occurs in the projection image is performed by signal processing.

Solutions to Problems

An image processing device according to the present technology includes: a blur correction unit that performs blur correction processing for focus blur correction on an input image on the basis of a blur characteristic that is a characteristic of a focus blur that occurs in a projection image of an image projection device, the blur characteristic being measured in a state where a predetermined candidate value is set as an optical adjustment value of the image projection device; and a use determination unit that performs evaluation regarding the focus blur on a projection image obtained by causing the image projection device to project an image subjected to the blur correction processing, and performs determination regarding whether or not the candidate value is usable on the basis of a result of the evaluation.

As a result, it is enabled to search for an adjustment value with which a good blur correction effect is obtained by the blur correction processing as the optical adjustment value of the image projection device.

In the image processing device according to the present technology described above, it is desirable that: the blur correction unit, on the basis of a blur characteristic of each of a plurality of the image projection devices, the blur characteristic being measured when image projection is individually performed in a state where the candidate value corresponding to each of the image projection devices is set, obtains blur-corrected images of the respective image projection devices by performing the blur correction processing for each of the image projection devices on the input image; and the use determination unit performs the evaluation regarding the focus blur on a superimposed projection image obtained by causing the plurality of image projection devices to superimpose and project the blur-corrected images, and performs the determination on the basis of a result of the evaluation.

As a result, it is enabled to search for an adjustment value with which a good blur correction effect is obtained by the blur correction processing as the optical adjustment value of each of the image projection devices that perform the superimposed projection.

In the image processing device according to the present technology described above, it is desirable that the blur correction unit performs the blur correction processing for each of the image projection devices on the basis of a filter coefficient for each of the image projection devices, the filter coefficient being obtained by a derivation formula from which the filter coefficient for blur correction corresponding to each of the image projection devices is derived and in which the blur characteristic for each of the image projection devices is collectively incorporated in one set.

By solving the derivation formula in which the blur characteristics of the respective image projection devices are collectively incorporated as described above, the correction filter coefficient for each of the image projection devices can converge not only to have a tendency that the blur itself is canceled out (that is, a tendency that an enhancement in a direction in which the blur is large is increased), but also to have a tendency that the enhancement in the direction in which the blur is large is decreased and an enhancement in a direction in which the blur is small is increased.

In the image processing device according to the present technology described above, it is desirable that the use determination unit causes the image projection device in a state where the candidate value is set to project a predetermined image to evaluate a projection range of the predetermined image, and in a case where the projection range does not satisfy a predetermined range condition, excludes a combination of the candidate value and the image projection device from a target of the evaluation regarding the focus blur.

For example, in a case where a swing width of the candidate value is increased to widen a search range for obtaining an optimal point of the adjustment value, there may be a case where the image projection range does not satisfy the predetermined range condition, for example, the projection range of the image largely deviates from a specified projection range in a combination of a certain candidate value and the image projection device, and the like. Since the fact that the image projection range does not satisfy the predetermined range condition is a problem before image quality improvement, the combination of these candidate value and image projection device is excluded from an evaluation target of the focus blur in an adjustment value search.

In the image processing device according to the present technology described above, it is desirable that the use determination unit excludes the image projection device arranged adjacent to the image projection device that is a target of the evaluation regarding the focus blur from the target of the evaluation regarding the focus blur.

The image projection devices whose arrangement positions are close to each other have a tendency that close values are set as the adjustment values, for example, a pan or tilt angle, an amount of lens shift, and the like. Thus, the image projection device arranged adjacent to the image projection device that is the target of the evaluation regarding the focus blur for determining the adjustment value is thinned out from the target of the evaluation, whereby the number of pieces of processing for the adjustment value search is reduced.

In the image processing device according to the present technology described above, it is desirable that the use determination unit acquires the adjustment value for a non-target device that is the image projection device excluded from the target of the evaluation, on the basis of the adjustment value used for the image projection device positioned closest to the non-target device among the image projection devices that are targets for the evaluation.

As a result, it is enabled to appropriately acquire the adjustment value of the image projection device excluded from the evaluation target for the adjustment value search by using closeness of the adjustment values depending on closeness of the arrangement positions.

In the image processing device according to the present technology described above, it is desirable that the adjustment value includes an adjustment value regarding a rotation angle in a pan or tilt direction of the image projection device.

The rotation angle in the pan or tilt direction of the image projection device is one of factors that change the characteristic of the focus blur that occurs in the projection image.

In the image processing device according to the present technology described above, it is desirable that the adjustment value includes an adjustment value regarding an amount of lens shift of the image projection device.

The amount of lens shift of the image projection device is one of the factors that change the characteristic of the focus blur that occurs in the projection image.

In the image processing device according to the present technology described above, it is desirable that the adjustment value includes an adjustment value regarding a focus position of the image projection device.

The focus position of the image projection device is one of the factors that change the characteristic of the focus blur that occurs in the projection image.

In the image processing device according to the present technology described above, it is desirable that the use determination unit determines whether or not the candidate value is usable by determining whether or not a degree of the focus blur is below a predetermined degree on the basis of a result of the evaluation regarding the focus blur.

As a result, it becomes unnecessary to try all the candidate values when searching for an adjustment value that satisfies a predetermined blur correction performance condition.

In the image processing device according to the present technology described above, it is desirable that the use determination unit performs determination of the candidate value to be used on the basis of a result of relatively evaluating the focus blur for a plurality of the candidate values.

As a result, it is enabled to search for a candidate value that gives the best evaluation result among the plurality of candidate values as the adjustment value to be used.

In the image processing device according to the present technology described above, it is desirable that the use determination unit re-executes evaluation targeted for the image projection device and regarding the focus blur on the basis of a temperature detection result by a temperature detection unit that detects a temperature of the image projection device, and re-executes the determination on the basis of a result of the evaluation re-executed.

As a result, it is enabled to re-search for the adjustment value corresponding to the case where the optimal adjustment value changes depending on the temperature.

Furthermore, an image processing method according to the present technology includes: a blur correction procedure of performing blur correction processing for focus blur correction on an input image on the basis of a blur characteristic that is a characteristic of a focus blur that occurs in a projection image of an image projection device, the blur characteristic being measured in a state where a predetermined candidate value is set as an optical adjustment value of the image projection device; and a use determination procedure of performing evaluation regarding the focus blur on a projection image obtained by causing the image projection device to project an image subjected to the blur correction processing, and performing determination regarding whether or not the candidate value is usable on the basis of a result of the evaluation.

With such an image processing method, a function similar to that of the image processing device according to the present technology described above can also be obtained.

Effects of the Invention

According to the present technology, a search is enabled for the adjustment value with which a good blur correction effect is obtained by the blur correction processing as the optical adjustment value of the image projection device, and blur correction performance can be improved in a case where the correction of the focus blur that occurs in the projection image is performed by signal processing.

Note that, the effect described here is not necessarily limited, and can be any effect described in the present disclosure.

BRIEF DESCRIPTION OF DRAWINGS

FIG. 6 is an explanatory diagram of a synthetic blur.

FIG. 9 is an explanatory diagram of setting conditions of candidate parameters.

FIG. 10 is a diagram for explaining an example of a method for determining whether or not an image projection range satisfies a predetermined range condition.

FIG. 11 is a diagram for explaining another example of the method for determining whether or not the image projection range satisfies the predetermined range condition.

FIG. 14 is an explanatory diagram of an example of an evaluation value regarding a focus blur.

MODE FOR CARRYING OUT THE INVENTION

Hereinafter, embodiments according to the present technology will be described in the following order with reference to the accompanying drawings.

<1. First Embodiment>
[1-1. Overview of Image Projection System]
[1-2. Configurations of Image Projection Device and Image Processing Device]
[1-3. Blur Correction Processing]
[1-4. Optical Adjustment Value Search Method as Embodiment]
[1-5. Modification of Candidate Value Evaluation]
<2. Second Embodiment>
[2-1. Configurations of Image Projection Device and Image Processing Device as Second Embodiment]
[2-2. Processing Procedure]
<3. Modifications>
<4. Summary of Embodiments>
<5. Present Technology>

1. First Embodiment

[1-1. Overview of Image Projection System]

Figure 1:
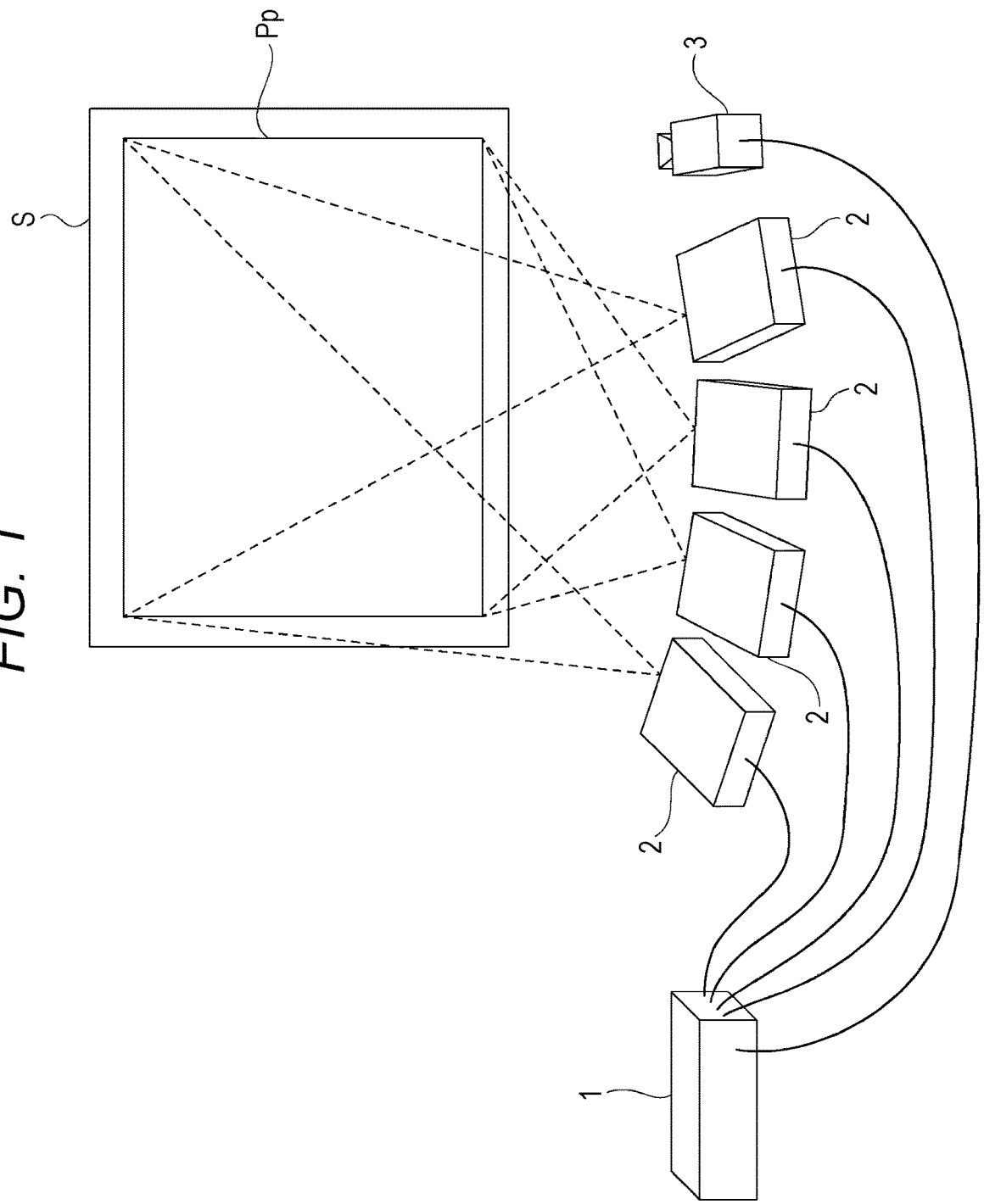
FIG. 1 is a diagram illustrating a configuration example of an image projection system including an image processing device as an embodiment.

FIG. 1 illustrates a configuration example of an image projection system (image projection system as an embodiment) including an image processing device 1 as an embodiment according to the present technology.

The image projection system as the embodiment includes an image processing device 1, n projector devices 2 (n is a natural number of greater than or equal to 2), and an imaging device 3. In the figure, the configuration is exemplified of the image projection system including four projector devices 2 (n=4).

Each projector device 2 is configured as a transmissive liquid crystal projector device. Specifically, the projector device 2 is configured as a so-called three-chip liquid crystal projector device including liquid crystal panels corresponding to red (R) color, green (G) color, and blue (B) color, respectively.

The image processing device 1 includes a computer device, for example, a Central Processing Unit (CPU), a Digital Signal Processor (DSP), or the like, and is enabled to perform various signal processing (image processing) on an image of digital data, and distribute and output the image to each projector device 2.

In the image projection system of the present embodiment, each projector device 2 projects the image distributed and output by the image processing device 1 onto a common screen S. At this time, projection of the image is performed so that projection images of respective projector devices 2 overlap each other on the screen S (so-called "superimposed projection"). Specifically, in the present embodiment, to improve luminance of the image displayed on the screen S, the superimposed projection is performed so that pixel positions of the projection images by the respective projector devices 2 coincide with each other.

Note that, a projection target of the image by the projector device 2 is not limited to the screen S, and can be a projection target other than the screen S, for example, a wall surface in a room, or the like.

Here, hereinafter, the image displayed on the projection target by the superimposed projection is referred to as a "superimposed projection image Pp".

The imaging device 3 is configured as a digital camera device including an imaging element, for example, a Charged-coupled devices (CCD) sensor, a Complementary metal-oxide-semiconductor (CMOS) sensor, or the like. The imaging device 3 is enabled to communicate with the image processing device 1 and transmit a captured image to the image processing device 1. In the present example, the imaging device 3 is used by the image processing device 1 to obtain an observation image of the projection image by the projector device 2, and is arranged at a position at which an entire projection range of the image on the screen S falls within an angle of view.

[1-2. Configurations of Image Projection Device and Image Processing Device]

Figure 2:
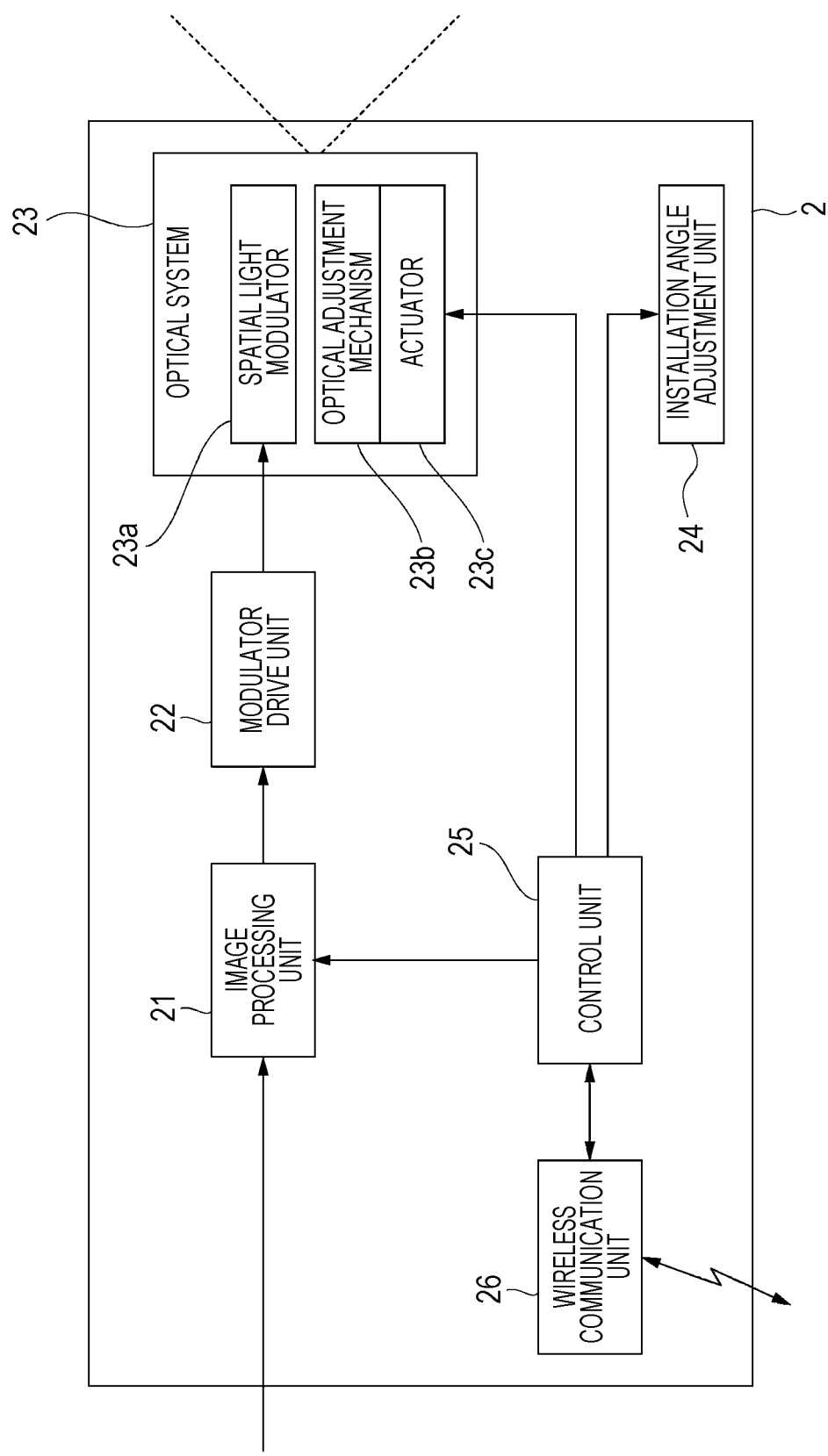
FIG. 2 is a block diagram illustrating an internal configuration example of an image projection device in a first embodiment.

FIG. 2 is a block diagram illustrating an internal configuration example of the projector device 2.

As illustrated in the figure, the projector device 2 includes an image processing unit 21, a modulator drive unit 22, an optical system 23, an installation angle adjustment unit 24, a control unit 25, and a wireless communication unit 26.

The image processing unit 21 performs predetermined image signal processing on an input image and outputs the image to the modulator drive unit 22. The modulator drive unit 22 drives a spatial light modulator 23a arranged in the optical system 23 in response to the image input from the image processing unit 21. The spatial light modulator 23a is a transmissive liquid crystal panel in the present example. In the projector device 2 of the present example, in practice, three spatial light modulator 23a are provided corresponding to respective colors of R, G, and B, and the image processing unit 21 generates an R image, a G image, and a B image corresponding to the respective colors of R, G, and B on the basis of the input image and outputs the images to the modulator control unit 22. The modulator control unit 22 drives the spatial light modulators 23a of the corresponding colors by drive signals respectively based on the input R image, G image, and B image.

The optical system 23 includes a light source (not illustrated), various optical elements such as a polarizing plate and a wave plate, and various lenses such as a projection lens, and modulates light emitted from the light source by the spatial light modulator 23a and outputs the light through the projection lens.

The optical system 23 of the present example includes an optical adjustment mechanism 23b and an actuator 23c. The optical adjustment mechanism 23b comprehensively represents a lens shift mechanism and a focus position adjustment mechanism. The lens shift mechanism is a mechanism for shifting (parallelly moving) a position of the projection image. The focus position adjustment mechanism is a mechanism for adjusting a position in focus in the projection image.

The actuator 23c comprehensively represents an actuator for driving the lens shift mechanism and the focus position adjustment mechanism described above.

Here, adjustment of a projection image position by the lens shift mechanism and adjustment of a focus position by the focus position adjustment mechanism will be described with reference to FIGS. 3 and 4.

Figure 3:
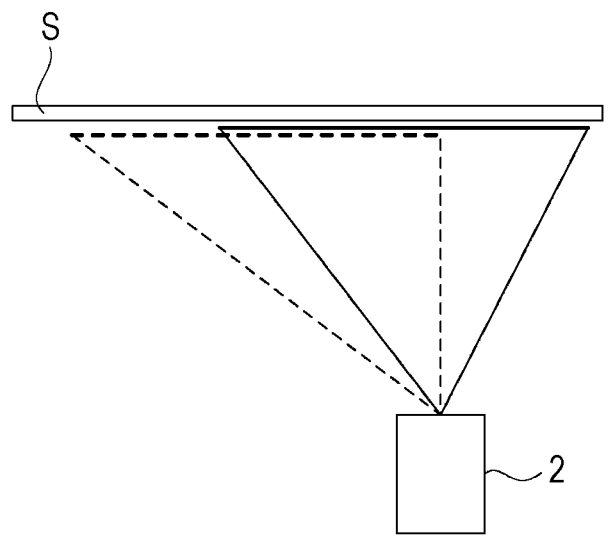
FIG. 3 is an explanatory diagram of adjustment of a projection image position by a lens shift mechanism.

As illustrated in FIG. 3, depending on the lens shift mechanism, the position of the projection image can be shifted in a direction parallel to a projection plane on the screen S (see a difference between the projection image position indicated by the thick broken line and the projection image position indicated by the thick solid line in the figure).

Figure 4:
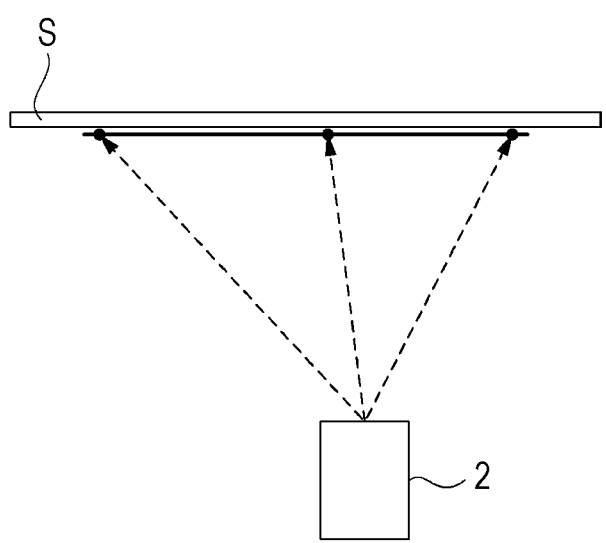
FIG. 4 is an explanatory diagram of adjustment of a focus position by a focus position adjustment mechanism.

Furthermore, as illustrated in FIG. 4, depending on the focus position adjustment mechanism, the position in focus (indicated by a black circle in the figure) can be adjusted in the projection image indicated by the thick solid line in the figure.

Referring back to FIG. 2, the description will be continued.

The installation angle adjustment unit 24 comprehensively represents a mechanism that adjusts an installation angle of the projector device 2, and an actuator for the mechanism. The installation angle adjustment unit 24 is enabled to adjust at least a rotation angle in a pan or tilt direction of the projector device 2. The installation angle adjustment unit 24 in the present example is enabled to adjust the rotation angle in each of the pan and tilt directions of the projector device 2.

Note that, the installation angle adjustment unit 24 may be provided outside the projector device 2.

Furthermore, when enabling adjustment of the rotation angle in each of the pan and tilt directions of the projector device 2, it is not essential to provide the installation angle adjustment unit 24. In a case where the installation angle adjustment unit 24 is not provided, the rotation angles in the pan direction and the tilt direction of the projector device 2 are manually set (that is, a person moves the projector device 2 to set the rotation angles in the pan direction and the tilt direction, that is, arrangement angles). In a case where the installation angle of the projector device 2 is manually adjusted as described above, the image processing device 1 is configured to instruct the person on a value of a candidate parameter described later regarding the installation angle. Specifically, it is conceivable to adopt, for example, a method in which the image processing device 1 is provided with an information presenting unit that presents information by image display or voice output, and the value of the candidate parameter is presented by the presenting unit.

The control unit 25 includes a microcomputer including, for example, a CPU, a Read Only Memory (ROM), a Random Access Memory (RAM), and the like, and executes processing according to a program stored in, for example, the ROM, thereby performing various types of operation control of the projector device 2. Specifically, the control unit 25 performs operation control of the image processing unit 21, the actuator 23c, and the installation angle adjustment unit 24.

The wireless communication unit 26 is connected to the control unit 25. The wireless communication unit 26 performs wireless communication with an external device in accordance with a predetermined wireless communication system, for example, Bluetooth (registered trademark), WiFi (registered trademark), or the like.

The control unit 25 is enabled to communicate various data with a predetermined device in the outside, in particular, the image processing device 1 in the present example, via the wireless communication unit 26.

Figure 5:
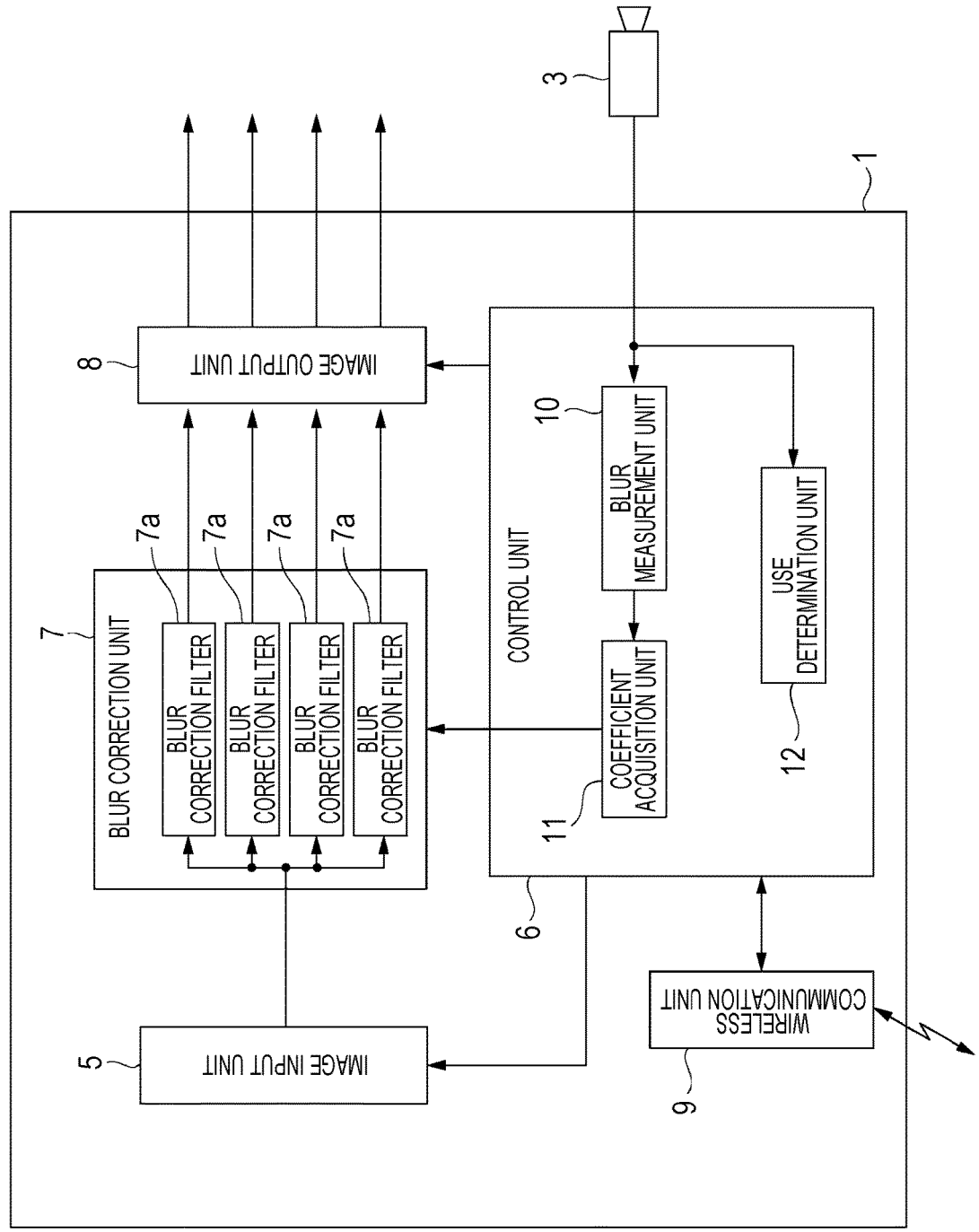
FIG. 5 is a block diagram for explaining a configuration example of the image processing device of the first embodiment.
Figure 7:
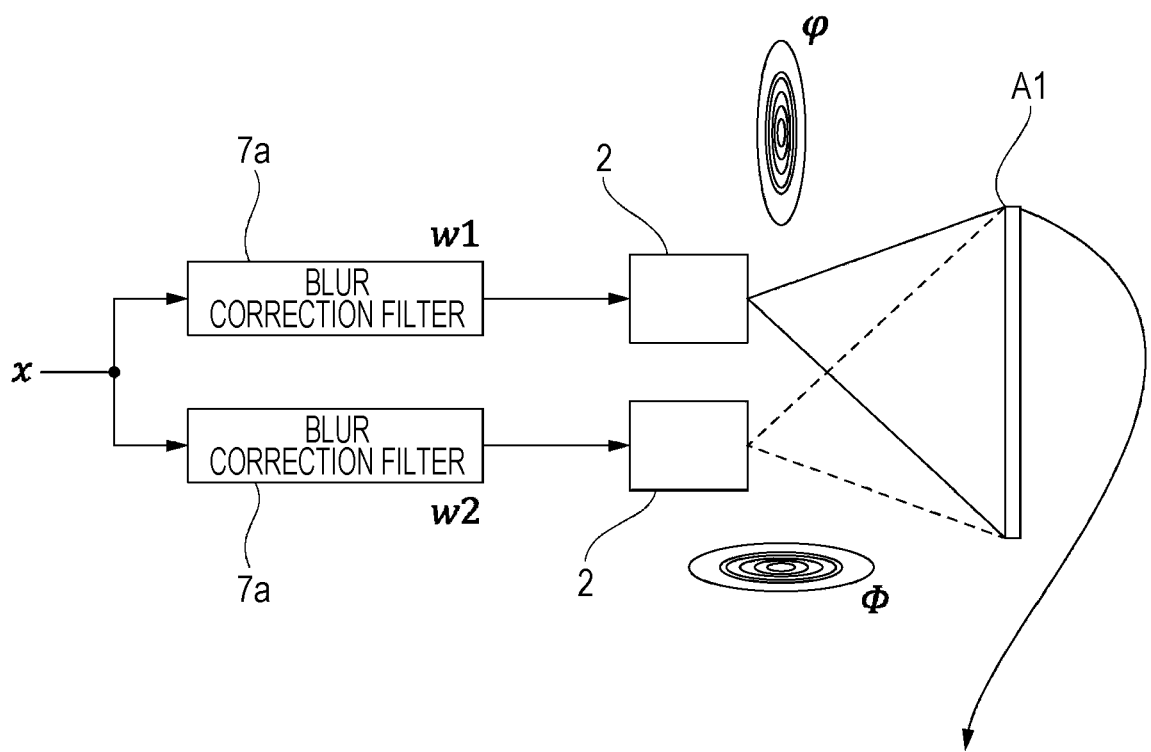
FIG. 7 is an explanatory diagram of a blur correction method as a preceding example.

FIG. 5 is a block diagram for explaining an internal configuration example of the image processing device 1, and also illustrates the imaging devices 3 illustrated in FIG. 1 together with the internal configuration example of the image processing device 1.

The image processing device 1 is enabled to perform signal processing (filter processing) for blur correction on an image to be projected to correct a synthetic blur that occurs in the superimposed projection image Pp, that is, a blur in which blurs that occur in the projection images of the respective projector devices 2 are synthesized, and to distribute and output the image subjected to the signal processing to each projector device 2 to cause the image to be projected.

Furthermore, the image processing device 1 is configured to cause a predetermined image to be projected for each projector device 2, as calibration, at a stage before performing the superimposed projection of an actual image content, and execute processing for optimizing an optical adjustment value of each projector device 2 on the basis of each captured image obtained by the imaging device 3 at that time.

As illustrated in the figure, the image processing device 1 includes an image input unit 5, a control unit 6, a blur correction unit 7, an image output unit 8, and a wireless communication unit 9.

The image input unit 5 inputs an image projected by the projector device 2 (that is, an image to be projected). Input of the image may be performed from, for example, an external device of the image processing device 1, or a configuration can be made in which image data stored in a storage device, for example, a Hard Disk Drive (HDD), a Solid State Drive (SSD), or the like provided in the image processing device 1 is read and input, and a specific input method is not particularly limited.

The blur correction unit 7 performs blur correction processing for each projector device 2 on the image input by the image input unit 5 on the basis of a filter coefficient for the blur correction on which an instruction is given by the control unit 6 (a coefficient acquisition unit 11 described later), and obtains a blur-corrected image for each projector device 2. Specifically, the blur correction unit 7 in the present example includes the same number of blur correction filters 7a as the projector devices 2, and the blur correction filters 7a each perform the blur correction processing on the input image by using the filter coefficient acquired for the corresponding projector device 2. As a result, the blur-corrected image for each projector device 2 is obtained.

In the present example, signal processing using a filter designed by an inverse function of a blur is adopted for the blur correction processing.

Note that, since the filter coefficient described above is acquired on the basis of a blur characteristic measured by a blur measurement unit 10 described later, it can be said that the blur correction unit 7 performs the blur correction processing for focus blur correction on the input image on the basis of the measured blur characteristic.

The image output unit 8 individually outputs a plurality of the blur-corrected images obtained by the blur correction unit 7. Specifically, the image output unit 8 of the present example outputs a corresponding one of the blur-corrected images for each projector device 2.

The projector devices 2 respectively project the corresponding blur-corrected images, whereby a focus blur in the superimposed projection image Pp can be eliminated.

Note that, the blur correction unit 7 in the present example is enabled to output the input image from the image input unit 5 without performing the blur correction processing. Furthermore, the image output unit 8 is enabled to select the projector device 2 to which the image is output among the connected projector devices 2 (here, four devices are connected, as an example) on the basis of an instruction from the control unit 6.

The control unit 6 includes a microcomputer including, for example, a CPU, a ROM, a RAM, and the like, and executes processing according to a program stored in, for example, the ROM, thereby performing various types of operation control of the image processing device 1.

The control unit 6 of the present example can be represented as including the blur measurement unit 10, the coefficient acquisition unit 10, and a use determination unit 12 in the figure, as its functional units.

The blur measurement unit 10 measures a characteristic of the focus blur (hereinafter referred to as a "blur characteristic") that occurs in the projection image of the projector device 2 on the basis of the captured image input from the imaging device 3.

Here, the blur characteristic regarding the focus blur that occurs in the projection image of the projector device 2 may be different for each pixel of the projection image. For that reason, the blur measurement unit 10 performs measurement of the blur characteristic of the captured image input from the imaging device 3 at a plurality of positions (a plurality of image areas) in the image.

The coefficient acquisition unit 11 acquires the filter coefficient for the blur correction on the basis of the blur characteristics of the respective projector devices 2 measured by the blur measurement unit 10. As will be described later, acquisition of the filter coefficient in the present example is performed by calculation using a predetermined derivation formula designed so that the corresponding filter coefficient is obtained from the blur characteristic.

Note that, details will be described later again of a signal processing method for the blur correction adopted in the embodiment, including the derivation formula described above.

The use determination unit 12 searches for an adjustment value for enhancing an effect of correcting the focus blur that occurs in the projection image as the optical adjustment value of the projector device 2, and performs determination of an adjustment value to be used. Specifically, the use determination unit 12 causes the projector device 2 to project an image subjected to the blur correction processing by the blur correction unit 7 in a state where a candidate value of the optical adjustment value is set in the projector device 2, performs evaluation regarding the focus blur on the projection image thus obtained, and performs determination regarding whether or not the candidate value is usable on the basis of a result of the evaluation.

Here, the above-described "optical adjustment value" targeted in the present embodiment is an adjustment value by which the blur characteristic of the focus blur that occurs in the projection image changes depending on the fact that the value changes. Specifically, the adjustment value includes the installation angle (rotation angle in the pan direction, rotation angle in the tilt direction) of the projector device 2 described above, an amount of shift of the projection image by the lens shift mechanism (hereinafter referred to as an "amount of lens shift"), and a value regarding the adjustment of the focus position adjusted by the focus position adjustment mechanism.

Note that, hereinafter, a value regarding the adjustment of each of the rotation angle in the pan direction, the rotation angle in the tilt direction, the amount of lens shift, and the focus position is also referred to as an "adjustment parameter".

The specific processing executed by the control unit 6 to implement a function as the use determination unit 12 will be described later again.

The wireless communication unit 9 performs wireless communication with an external device in accordance with a predetermined wireless communication system, for example, Bluetooth, WiFi, or the like.

The wireless communication unit 9 is connected to the control unit 6, so that the control unit 6 is enabled to communicate various data, via the wireless communication unit 9, with a predetermined device in the outside, in particular, the projector device 2 (control unit 25) in the present example. For example, it is enabled to transmit the data such as the adjustment parameter determined by the use determination unit 12 described above to the projector device 2.

[1-3. Blur Correction Processing]

A blur correction processing method adopted in the embodiment will be described.

First, the synthetic blur that occurs in the superimposed projection image Pp will be described with reference to FIG. 6.

FIG. 6A exemplifies two different image areas A1 and A2 in the superimposed projection image Pp. The horizontal and vertical directions of the paper surface correspond to the horizontal and vertical directions of the image, respectively, and it is assumed that the image area A1 is an area on the upper left corner of the superimposed projection image Pp, and the image area A2 is an area on the upper right corner of the superimposed projection image Pp.

As illustrated in FIG. 6B, for the sake of explanation, a case is considered where the superimposed projection image Pp is obtained by image projection of the two projector devices 2.

Since the two projector devices 2 cannot be arranged at the same position during the superimposed projection, the focus blurs respectively having different characteristics occur in the projection images by the respective projector devices 2 mainly due to a difference in the optical path length to the projection plane, and the like. At this time, the focus blur that occurs in the superimposed projection image Pp is due to the focus blur that occurs in the projection image of each projector device 2; however, in the projection image of the projector device 2 alone, the characteristic of the focus blur may be different for each pixel (each area in the image). This is due to the fact that the difference occurs in the optical path length to each area in the image.

Here, for example, in a case where the two projector devices 2 are arranged apart from each other on the left and right as illustrated in FIG. 6B, a characteristic of the focus blur that occurs in the image area A1 in the projection image of the projector device 2 on the left side is set as a blur characteristic C1L. Furthermore, a characteristic of the focus blur that occurs in the image area A2 in the projection image of the projector device 2 on the left side is set as a blur characteristic C2L. Moreover, characteristics of focus blurs that occur in the image areas A1 and A2 in the projection image of the projector device 2 on the right side are set as blur characteristics C1R and C2R, respectively.

FIG. 6C schematically illustrates an example of these blur characteristics C1L, C2L, C1R, and C2R. Here, as a visualization model of each blur characteristic C, a visualization model of a Point Spread Function (PSF) is illustrated.

As illustrated in the figure, regarding the blur characteristics C1L and C2L due to the projector device 2 on the left side, the blur characteristic C1L has a tendency that the blur in the horizontal direction of the image is small and the blur in the vertical direction is large, whereas, conversely, the blur characteristic C2L has a tendency that the blur in the vertical direction is small and the blur in the horizontal direction is large.

Furthermore, regarding the blur characteristics C1R and C2R due to the projector device 2 on the right side, the blur characteristic C1R has a tendency that the blur in the vertical direction is small and the blur in the horizontal direction is large, and the blur characteristic C2R has a tendency that the blur in the vertical direction is large and the blur in the horizontal direction of the image is small.

Focusing on the image area A1, the blur characteristic C1L of the projector device 2 on the left side has a tendency that the blur in the horizontal direction is small since the optical path length in the horizontal direction from the projector device 2 to the image area A1 is relatively short. On the other hand, the blur characteristic C1R of the projector device 2 on the right side has a tendency that the blur in the horizontal direction is large since the optical path length in the horizontal direction from the projector device 2 to the image area A1 is relatively long. For a similar reason, focusing on the image area A2, the blur characteristic C2L of the projector device 2 on the left side has a tendency that the blur in the horizontal direction is large, and, conversely, the blur characteristic C2R of the projector device 2 on the right side has a tendency that the blur in the horizontal direction is small.

As described above, in the case where the superimposed projection is performed, the blur characteristic of each projector device 2 may be different for each area in the image.

Here, as a method for correcting the blur that occurs in the superimposed projection image Pp, there is a method as a preceding example as described below.

FIG. 6 is an explanatory diagram of a blur correction method as a preceding example.

Note that, also here, for convenience of explanation, it is assumed that the superimposed projection is performed by the two projector devices 2. Furthermore, here, the blur correction processing for a single area in the image is considered. By performing the blur correction on each area in the image by a method similar to a method described below, it is possible to implement the blur correction of the entire superimposed projection image Pp.

The blur correction method as the preceding example uses a filter designed by an inverse function of a blur when correcting the blur. That is, the blur correction filter 7a described above is used. In the figure, the two blur correction filters 7a are provided corresponding to a case where the superimposed projection is performed by the two projector devices 2.

Here, a characteristic of a blur that occurs in a projection image (here, a single area in the image) of one projector device 2 is set as a blur characteristic cp, and a characteristic of a blur that occurs in a projection image (similarly, a single area in the image) of the other projector device 2 is set as a blur characteristic Φ.

Furthermore, a filter coefficient for correcting the blur due to the blur characteristic φ is w1, and a filter coefficient for correcting the blur due to the blur characteristic Φ is w2.

The filter processing for the blur correction here is processing of emphasizing (enhancing) an edge, and is performed by using a plurality of filter coefficients in one set, for example, a 5×5 filter, or the like. That is, the filter coefficients w1 and w2 described above include a plurality of filter coefficients.

A pixel value of an image obtained by performing the filter processing for the blur correction by the blur correction filter 7a on the input image and projecting the image by the projector device 2 can be expressed by [Formula 1] or [Formula 2] below for each projector device 2.

[Expression 1]

$$\sum_j \varphi_j \left( \sum_i w1_i x_i \right)$$ [Formula 1]

[Expression 2]

$$\sum_j \Phi_j \left( \sum_i w2_i x_i \right)$$ [Formula 2]

That is, a value of the projection image of the one projector device 2 in this case can be expressed as a value obtained by performing blur addition processing based on the blur characteristic φ and blur correction processing based on the filter coefficient w1 on a pixel value x of the input image, as in [Formula 1]. Furthermore, a value of the projection image of the other projector device 2 in this case can be expressed as a value obtained by performing blur addition processing based on the blur characteristic Φ and blur correction processing based on the filter coefficient w2 on the pixel value x, as in [Formula 2].

In the preceding example, the filter coefficients w1 and w2 for the blur correction are obtained on the basis of derivation formulas indicated in [Formula 3] and [Formula 4] below.

[Expression 3]

$$Q1 = \frac{1}{2} y - \sum_j \varphi_j \left( \sum_i w1_i x_i \right)$$ [Formula 3]

[Expression 4]

$$Q2 = \frac{1}{2} y - \sum_j \Phi_j \left( \sum_i w2_i x_i \right)$$ [Formula 4]

Here, in [Formula 3] and [Formula 4], "y" is an ideal value of a pixel value of the superimposed projection image Pp, and specifically, represents a pixel value of the superimposed projection image Pp in an ideal state where a focus blur does not occur.

In the preceding example, the filter coefficient w1 corresponding to the one projector devices 2 is obtained on the basis of Q1 represented by [Formula 3], that is, a value of an error between the value obtained by performing the blur addition processing based on the blur characteristic φ and the blur correction processing based on the filter coefficient w1 on the pixel value x, and a predetermined ideal value (here, y/2). Specifically, the filter coefficient w1 is obtained that makes the error Q1 as small as possible.

Furthermore, in the preceding example, the filter coefficient w2 corresponding to the other projector device 2 is obtained on the basis of Q2 represented by [Formula 4], that is, a value of an error between the value obtained by performing the blur addition processing based on the blur characteristic Φ and the blur correction processing based on the filter coefficient w2 on the pixel value x, and a predetermined ideal value (y/2). Specifically, the filter coefficient w2 is obtained that makes the error Q2 as small as possible.

However, according to the method of the preceding example described above, since the filter coefficient w for each projector device 2 is individually obtained to cancel out the blur (φ or Φ) due to a single characteristic, there is a possibility that the blur cannot be completely corrected in a case where the blur that occurs is large.

For example, it is assumed that the blur characteristic φ has a characteristic that the blur in the vertical direction is large and the blur in the horizontal direction is small like the blur characteristic C1L described above, and the blur characteristic Φ has a characteristic that the blur in the horizontal direction is large and the blur in the vertical direction is small like the blur characteristic C1R.

In this case, in a case where the filter coefficient w1 that eliminates the blur due to φ is obtained as in [Formula 3], the filter coefficient w1 is obtained that increases an enhancement in the vertical direction in which the blur is large. Furthermore, in a case where the filter coefficient w2 that eliminates the blur due to Φ is obtained as in [Formula 4], the filter coefficient w2 is obtained that increases an enhancement in the horizontal direction in which the blur is large.

At this time, the filter coefficient w has a tendency that a coefficient with a larger absolute value is derived to cancel out a larger blur, but in a case where a blur to be canceled out is large and a coefficient with a large absolute value is obtained, there is a possibility that a pixel value after the blur correction exceeds a dynamic range, and an effect of the correction cannot be reflected in the projection image.

Thus, in the method of the preceding example having a tendency that the enhancement in the direction in which the blur is large is increased as described above, there is a limit to the size of a blur that can be eliminated.

Thus, in the present embodiment, the filter coefficients w1 and w2 are obtained on the basis of a derivation formula in which a plurality of blur characteristics is collectively incorporated in one set, as in [Formula 5] below.

[Expression 5]

$$Q = y - \sum_j \varphi_j \left( \sum_i w1_i x_i \right) - \sum_j \Phi_j \left( \sum_i w2_i x_i \right)$$ [Formula 5]

Specifically, the filter coefficients w1 and w2 are obtained that make an error Q in [Formula 5] as small as possible.

It can be said that the error Q is a difference between a sum total of the values obtained by performing the blur addition processing based on the blur characteristic and the blur correction processing based on the filter coefficient (w1, w2) on the pixel value x for each blur characteristic (φ, Φ), and a predetermined ideal value (y).

In short, it can be said that [Formula 5] obtains the filter coefficients w1 and w2 on the basis of the plurality of blur characteristics, not on the basis of only a single blur characteristic as in the preceding example.

If the derivation formula is solved for each single blur characteristic as in the preceding example (that is, if the derivation formula in which only the single blur characteristic is incorporated is solved) for the plurality of blur characteristics, only the filter coefficient w is obtained that cancels out the blur due to that blur characteristic. That is, for example, if the blur in the vertical direction is large, only the filter coefficient w is obtained that performs enhancement in the vertical direction.

On the other hand, if each filter coefficient is obtained on the basis of the plurality of blur characteristics as in [Formula 5], that is, obtained by a derivation formula in which the plurality of blur characteristics is collectively incorporated, the filter coefficient w for each blur characteristic can converge not only to have a tendency that a single blur is canceled out as in the preceding example (tendency that an enhancement in a direction in which the blur is large is increased), but also to have a tendency that the enhancement in the direction in which the blur is large is decreased and an enhancement in a direction in which the blur is small is increased. That is, for example, for the filter coefficient w used for the projector device 2 on the left side in which the blur in the vertical direction is large and the blur in the horizontal direction is small like the blur characteristic C1L for the image area A1 illustrated in FIG. 3, it becomes possible to converge to the filter coefficient w that makes the enhancement in the vertical direction small and makes the enhancement in the horizontal direction small. Furthermore, for the filter coefficient w used for the projector device 2 on the right side in which the blur in the horizontal direction is large and the blur in the vertical direction is small like the blur characteristic C1R for the image area A1, it becomes possible to converge to the filter coefficient w that makes the enhancement in the vertical direction large and makes the enhancement in the horizontal direction small. As a result of summing up the corrections by the filter coefficients w, the synthetic blur due to the two blur characteristics is appropriately corrected for the image area A1. That is, the enhancement in the horizontal direction of the projector device 2 on the left side functions as a correction for a horizontal direction blur that occurs in the projection image of the projector device 2 on the right side, and the enhancement in the vertical direction of the projector device 2 on the right side functions as a correction for a vertical direction blur that occurs in the projection image of the projector device 2 on the left side, and the correction for the synthetic blur is performed appropriately by the sum of the two corrections.

As described above, if it is possible to perform enhancement in the direction in which the blur is small mutually for each blur characteristic and to correct the synthetic blur by the sum of those corrections, it is possible to increase an amount of the blur that can be corrected more than in a case where the method is adopted of performing enhancement in the direction in which the blur is large as in the preceding example. That is, it is possible to improve correction performance for the synthetic blur, and further improve image quality.

Note that, in the above, the derivation formula has been exemplified for the synthetic blur in a case where the two projector devices 2 perform the superimposed projection; however, for the derivation formula in a case where the n projector devices 2 perform the superimposed projection, a derivation formula is used in which the blur characteristics of the respective projector devices 2, that is, n blur characteristics are collectively incorporated.

Furthermore, the derivation formula described above is a formula that derives a correction filter coefficient for a blur that occurs in one image area, and to perform the blur correction in the entire area of the superimposed projection image Pp, the filter coefficient w of each projector device 2 is obtained by a similar derivation formula for each of a plurality of required image areas in the image.

On the basis of the blur characteristic for each image area of each projector device 2 measured by the blur measurement unit 11, the coefficient acquisition unit 11 in the present example obtains the filter coefficient w for each image area of each projector device 2 by using a derivation formula in which the blur characteristics of the respective projector devices 2 are collectively incorporated in one set as in [Formula 5] described above.

[1-4. Optical Adjustment Value Search Method as Embodiment]

An adjustment parameter search method as the first embodiment will be described with reference to FIGS. 8 to 14.

Figure 8:
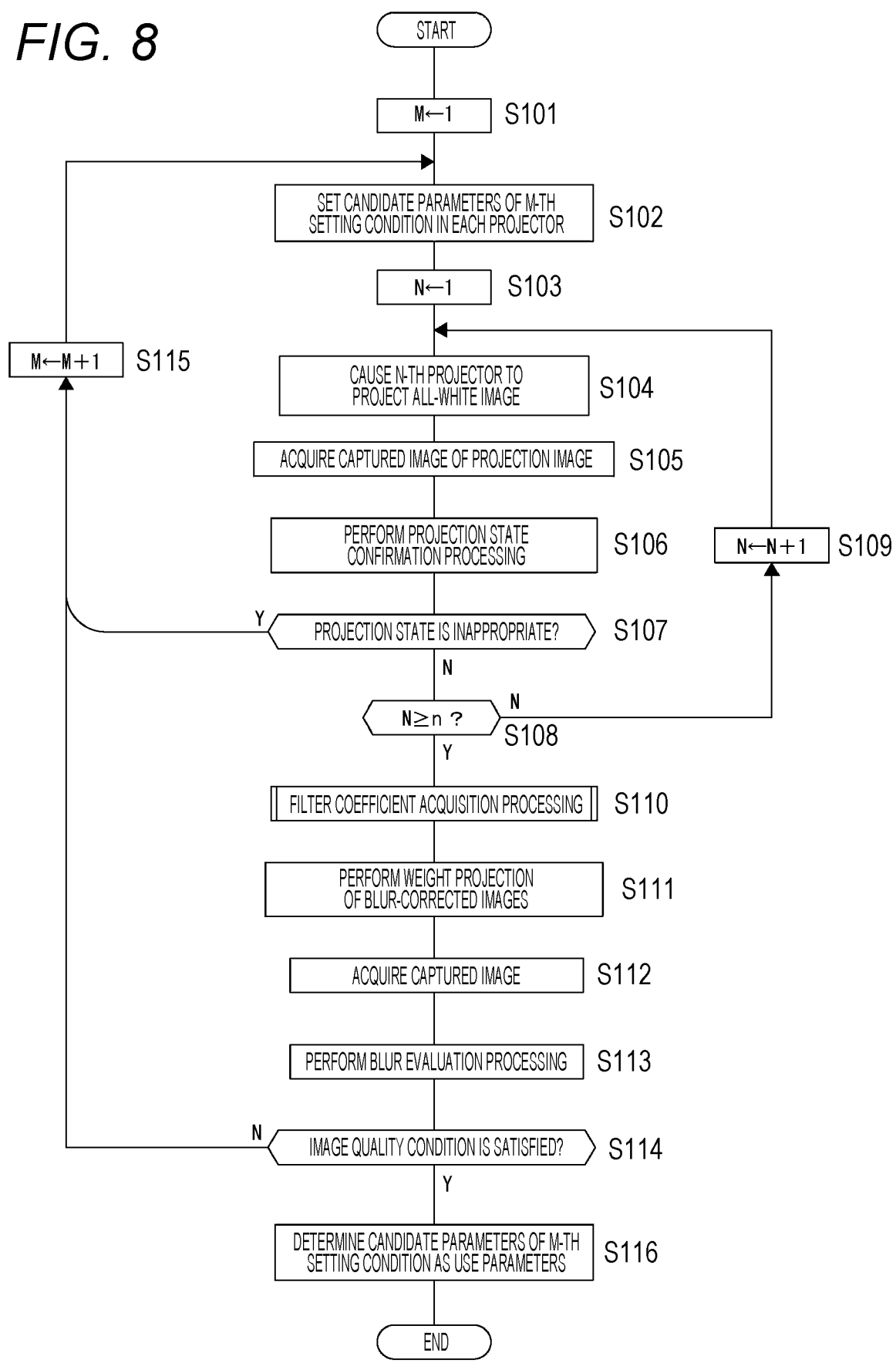
FIG. 8 is a flowchart illustrating a specific processing procedure to be executed to implement an adjustment parameter search method as the first embodiment.

FIG. 8 is a flowchart illustrating a specific processing procedure to be executed by the CPU in the control unit 6 to implement the adjustment parameter search method as the first embodiment. The processing illustrated in FIG. 8 is executed at the time of calibration at the stage before performing the superimposed projection of the actual image content described above.

As a rough processing flow, first, for each projector device 2, image projection is executed in a state where predetermined candidate values of adjustment parameters (hereinafter referred to as "candidate parameters") are set, and at that time, the blur characteristic is measured for each projector device 2 on the basis of the captured image obtained by the imaging device 3, and the filter coefficient w based on the measured blur characteristic is acquired (steps S102 and S110). Then, blur-corrected images of the respective projector devices 2 are obtained by the blur correction processing using the acquired filter coefficient w, the blur-corrected images are caused to be superimposed and projected, the evaluation regarding the focus blur is performed on the basis of the captured image of the imaging device 3 obtained at that time, and determination of the adjustment parameters is performed on the basis of an evaluation result (steps S111 to S116).

Specific processing will be described.

First, the control unit 6 sets a setting condition identifier M to "1" in step S101, and performs processing for setting the candidate parameters of the M-th setting condition in each projector device 2 in step S102. The setting condition identifier M is an identifier for identifying a setting condition of the candidate parameters for each projector device 2.

In the present example, m setting conditions (m is a natural number of greater than or equal to 2) from the 1st to the m-th are predetermined as the setting conditions of the candidate parameters as exemplified in FIG. 9.

As indicated in the figure, each setting condition defines a combination of the candidate parameters to be set for each of the n projector devices 2. In the present example, there are four types of the candidate parameters set for each projector device 2 in each setting condition, the rotation angle in the pan direction ("pan" in the figure), the rotation angle in the tilt direction ("tilt" in the figure), the amount of lens shift ("lens shift" in the figure), and the focus position.

In the present example, the image processing device 1 stores table information defining a plurality of setting conditions for candidate parameters as indicated in FIG. 9, in a predetermined storage device (for example, a storage device such as the ROM included in the control unit 6).

In step S102 in FIG. 8, the control unit 6 reads the candidate parameters of the M-th setting condition from the table information described above, and transmits the candidate parameters to the corresponding projector device 2 via the wireless communication unit 9 to instruct the control unit 25 on the setting.

In response to the instruction described above, the control unit 25 in each projector device 2 gives a drive instruction of the optical adjustment mechanism 23b and a rotation angle setting instruction according to the received candidate parameters respectively to the actuator 23c and the installation angle adjustment unit 24. As a result, adjustment values of each projector device 2, the rotation angles in the pan direction and tilt direction, the amount of lens shift, and the focus position, are set as the adjustment values as the candidate parameters.

The processing of steps S103 to S109 subsequent to step S102 is processing for determining whether or not the candidate parameters set in each projector device 2 are appropriate as evaluation targets. Specifically, the processing is for determining whether or not the candidate parameters are appropriate as the evaluation targets on the basis of whether or not an image projection range of the projector device 2 in a state where the candidate parameters are set satisfies a predetermined range condition.

FIG. 10A exemplifies a state where a projection image Pa of the projector device 2 falls within a captured image Pi by the imaging device 3, and FIG. 10B exemplifies a state where the projection image Pa does not completely fall within the captured image Pi.

In a case where the candidate parameters are set, it can also be assumed that a position of the projection image Pa deviates significantly from a proper position as illustrated in FIG. 10B. In a case where there is even one projector device 2 having an inappropriate image projection position as described above, it is no longer possible to appropriately perform the superimposed projection. For that reason, the candidate parameters in this case are excluded from the target of the evaluation regarding the focus blur.

In step S103 in FIG. 8, the control unit 6 sets a projector identifier N to "1". The projector identifier N is an identifier for identifying the projector device 2.

In subsequent step S104, the control unit 6 causes the N-th projector device 2 to project an all-white image. That is, the image input unit 5 is instructed to input the all-white image in which all pixels are displayed in white to the blur correction unit 7. At this time, the blur correction unit 7 is instructed to turn off a blur correction function so that the input all-white image is input to the image output unit 8 without undergoing the blur correction processing. Furthermore, at this time, the image output unit 8 is instructed to output the all-white image only to the N-th projector device 2.

In step S105 subsequent to step S104, the control unit 6 executes processing of acquiring the captured image (Pi) of the projection image (Pa), that is, processing of acquiring the captured image of the imaging device 3.

Next, in step S106, the control unit 6 performs processing for confirming the image projection range on the basis of the acquired captured image as projection state confirmation processing. Specifically, as the confirmation processing, the control unit 6 performs processing of obtaining the number of pixels (hereinafter, referred to as "number of pixels V") whose luminance value is greater than or equal to a predetermined threshold value THl in the captured image.

In subsequent step S107, the control unit 6 determines whether or not the projection state is inappropriate. Specifically, in the present example, it is determined whether or not the number of pixels V described above is less than a predetermined threshold value THv. If the number of pixels v is large, it can be estimated that an area of the projection image displayed in the captured image is large, and thus, determining whether or not the number of pixels V is less than the threshold value THv corresponds to determining whether or not the image projection range satisfies a predetermined range condition, specifically, whether or not the image projection range largely deviates from a specified range.

Note that, a method for determining whether or not the image projection range satisfies the predetermined range condition is not limited to the method exemplified above.

For example, although the number of pixels v is calculated for all the pixels of the captured image Pi, it is also possible to define a target area At in the captured image Pi as illustrated in FIG. 11, and obtain the number of pixels v in the target area At.

Furthermore, not limited to the determination method using the number of pixels v, other determination methods can also be adopted, for example, determination based on a result of detecting an edge of the projection image, and the like.

Furthermore, the image projected in determining whether or not the image projection range satisfies a predetermined range condition does not necessarily have to be an all-white image.

In step S107, in a case where it is determined that the number of pixels V is less than the predetermined threshold value THv and the projection state is inappropriate, the control unit 6 proceeds to step S115 and increments the setting condition identifier M by 1 (M←M+1), and then returns to step S102. As a result, the candidate parameters corresponding to the next setting condition are set in each projector device 2. That is, for the setting condition including the candidate parameters that make the projection state inappropriate, the processing in step S110 and subsequent steps is not executed, and the setting condition is excluded from the target of the evaluation regarding the focus blur. In other words, at least a combination of the candidate parameters and the projector device 2 that make the projection state inappropriate is excluded from the target of the evaluation regarding the focus blur.

Furthermore, in step S107, in a case where it is determined that the number of pixels V is not less than the predetermined threshold value THv and the projection state is not inappropriate, the control unit 6 proceeds to step S108 to determine whether or not the projector identifier N is greater than or equal to n (N≥n), and, if N≥n is not satisfied, returns to step S104. As a result, for the next projector device 2, the processing is executed that is described in steps S104 to S107, that is, processing for determining whether or not the combination of the set candidate parameters and the projector device 2 is appropriate as the evaluation target.

On the other hand, in a case where it is determined in step S108 that N≥n is satisfied, the control unit 6 executes filter coefficient acquisition processing of step S110. The filter coefficient acquisition processing is processing of acquiring the filter coefficient w for the blur correction processing on the basis of the blur characteristic of the projection image measured for each projector device 2.

Figure 12:
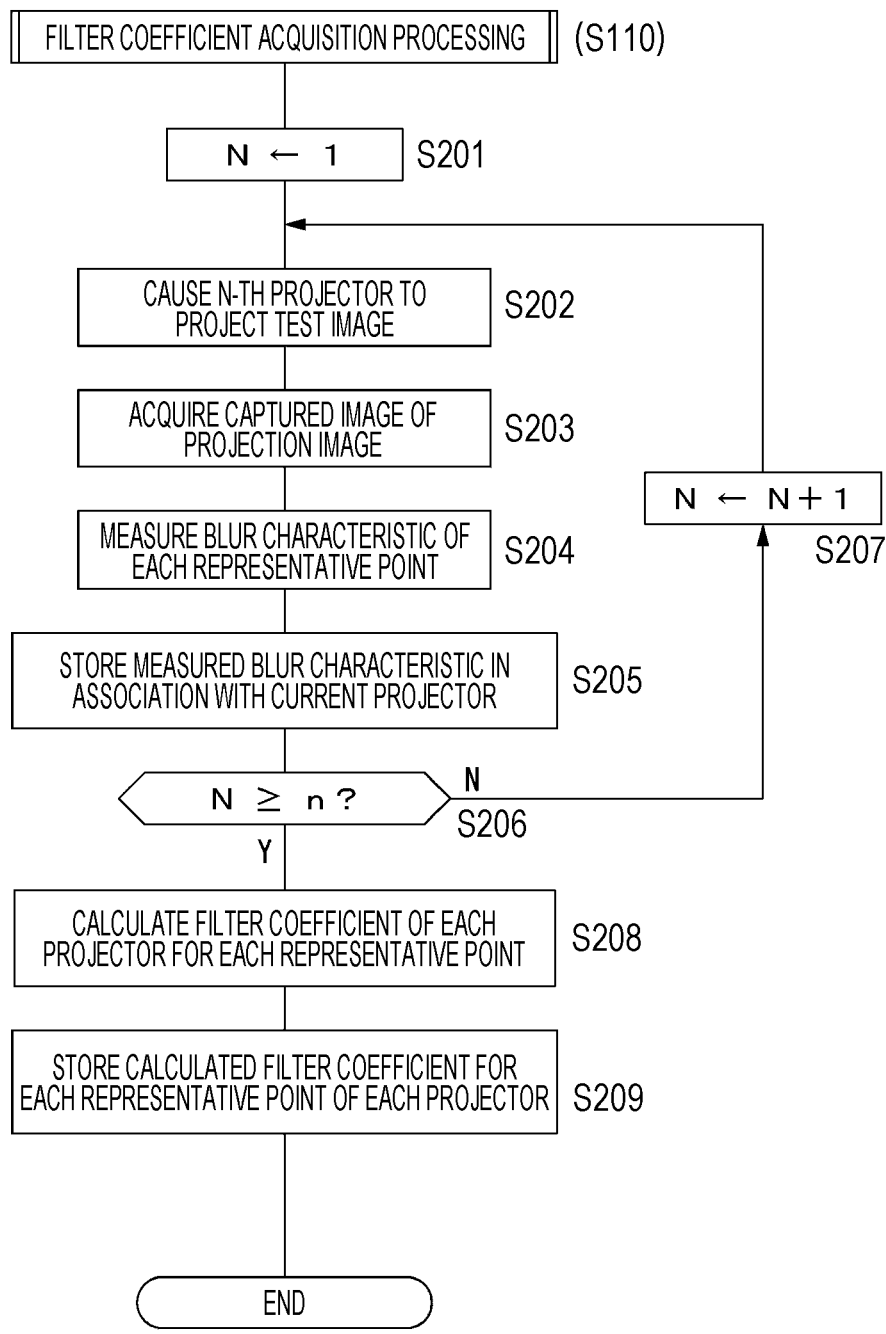
FIG. 12 is a flowchart of filter coefficient acquisition processing in the embodiment.

FIG. 12 is a flowchart illustrating the filter coefficient acquisition processing of step S110. In FIG. 12, the control unit 6 sets the projector identifier N to "1" in step S201, and then causes the N-th projector device 2 to project a predetermined test image in step S202. In the present example, as the test image, an image is used in which o representative points (o is a natural number of greater than or equal to 2) is set. For example, as the representative points, five or more points are set including a total of five points at the center and four corners of the image, and as the test image, for example, an image is used in which only the pixels corresponding to those representative points are caused to emit light.

The control unit 6 instructs the image input unit 5 to input the test image to the blur correction unit 7. At this time, the blur correction unit 7 is instructed to turn off the blur correction function so that the input test image is input to the image output unit 8 without undergoing the blur correction processing. Furthermore, at this time, the image output unit 8 is instructed to output the test image only to the N-th projector device 2.

Next, in step S203, the control unit 6 performs processing of acquiring the captured image of the projection image from the imaging device 3.

Moreover, in next step S204, the control unit 6 measures a blur characteristic of each representative point.

Figure 13:
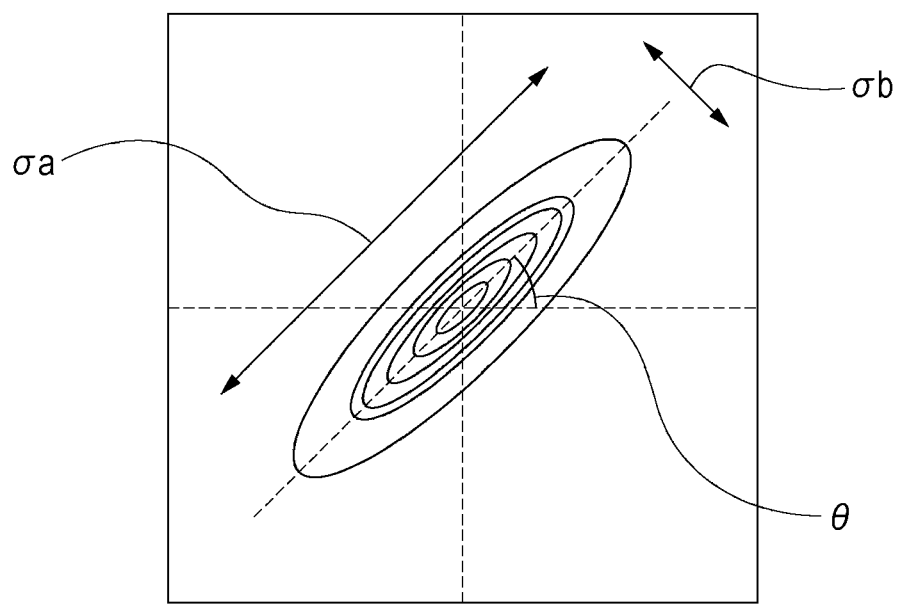
FIG. 13 is a diagram for explaining an example of data of a simplified model of a blur.

At this time, data of the blur characteristic may be data representing a point spread function, but in the present example, to reduce the data capacity, for example, data of a simplified model of a blur as illustrated in FIG. 13 is adopted. The simplified model illustrated in FIG. 13 represents the blur characteristic simply on the premise that the spread of the blur on the projection plane is a normal distribution, and represents the blur characteristic by using degrees of blur in respective directions (σa, σb) and an angle θ for defining a direction of the blur. The σa and σb respectively represent the degrees of blur in the directions orthogonal to each other.

Note that, the specific data representing the blur characteristic is not particularly limited, and can be, for example, coefficient data of a Low Pass Filter (LPF).

In step S205 subsequent to step S204, the control unit 6 performs processing of storing the measured blur characteristic in association with the current projector device 2. That is, the blur characteristic for each representative point measured in step S204 is caused to be stored in a predetermined storage device (for example, the RAM of the control unit 6, or the like) in association with the current projector device 2 (current projector identifier N).

Next, in step S206, the control unit 6 determines whether or not the projector identifier N is greater than or equal to n (N≥n). That is, it is determined whether or not the blur characteristics have been measured for all the projector devices 2.

If N≥n is not satisfied in step S206, the control unit 6 increments a value of the projector identifier N by 1 (N←N+1) in step S207, and returns to step S202. As a result, projection of the test image and measurement of the blur characteristic are performed for the next projector device 2.

On the other hand, if N≥n is satisfied, the control unit 6 proceeds to step S208 to calculate the filter coefficient w of each projector device 2 for each representative point. That is, the filter coefficient w of each projector device 2 is calculated for each representative point by using a derivation formula in which the blur characteristics (n blur characteristics) of the respective projector devices 2 are collectively incorporated in one set. The derivation formula of [Formula 5] above corresponds to the case where the superimposed projection is performed by the two projector devices 2, and terms subtracted from the ideal value y are two terms respectively including the blur characteristic φ and the blur characteristic Φ; however, for the derivation formula used in step S208, a formula is used that subtracts n terms each including a corresponding one of the blur characteristics measured for the respective projector devices 2 for a target representative point from the ideal value y.

In step S209 subsequent to step S208, the control unit 6 executes processing for storing the calculated filter coefficient w for each representative point of each projector device 2. At this time, the filter coefficient w is stored in, for example, the RAM of the control unit 6, or the like.

In response to executing the storage processing of step S209, the control unit 6 ends the filter coefficient acquisition processing illustrated in FIG. 12.

The filter coefficient acquisition processing illustrated in FIG. 12 is executed, whereby the filter coefficient w for minimizing the focus blur is acquired under a state where the candidate parameters in the M-th setting condition are set.

In response to executing the filter coefficient acquisition processing of step S110, the control unit 6 advances the processing to step S111 illustrated in FIG. 8.

In step S111, the control unit 6 executes the superimposed projection processing of the blur-corrected images. That is, the filter coefficient w for each representative point of each projector device 2 acquired in the filter coefficient acquisition processing of step S110 is caused to be set in the blur correction filter 7a provided for each projector device 2 in the blur correction unit 7, and also the image input unit 5 is caused to input a predetermined image, so that the blur-corrected images of the respective projector devices 2 are generated in the blur correction unit 7. Then, the image output unit 8 is caused to output the blur-corrected images of the respective projector devices 2 to the corresponding projector devices 2, and the n projector devices 2 are caused to superimpose and project the blur-corrected images.

Note that, for the filter processing of each pixel other than the representative points, the blur correction processing in the blur correction unit 7 is executed by using a filter coefficient based on the filter coefficient w at the representative points, for example, by using linear interpolation of the filter coefficients w at the representative points, or the like.

In subsequent step S112, the control unit 6 performs captured image acquisition processing, that is, processing of acquiring, from the imaging device 3, a captured image of the superimposed projection image Pp displayed on the screen S by the processing of step S111 described above, and performs blur evaluation processing in next step S113.

The blur evaluation processing of step S113 is processing of performing the evaluation regarding the focus blur that occurs in the superimposed projection image Pp on the basis of the captured image acquired in step S112. In the present example, as an evaluation value for performing the evaluation regarding the focus blur, an evaluation value Vr is used that represents a resolution of the projection image. Specifically, the evaluation value Vr in this case is a value obtained by dividing the maximum value of luminance differences between adjacent pixels in an evaluation target image (hereinafter referred to as an "adjacent pixel maximum luminance difference value") by a value of the dynamic range of the luminance. Here, if the luminance value has 256 gradations (0 to 255), the value of the dynamic range is "255".

FIG. 14 is an explanatory diagram of the evaluation value Vr.

FIG. 14A is an example of an image in which white pixels (luminance value=255) and black pixels (luminance value=0) are adjacent to each other. In this case, the adjacent pixel maximum luminance difference value in the image is "255" from |255-0|, and "1" is calculated as the evaluation value Vr.

FIG. 14B exemplifies a case where edge portions between the white pixels and the black pixels illustrated in FIG. 14A are blurred due to the focus blur. In this case, the adjacent pixel maximum luminance difference value is smaller than "255", and a value smaller than "1" is calculated as the evaluation value Vr.

As described above, the evaluation value Vr is a value in which "1" represents the highest resolution, and the smaller the value, the lower the resolution.

In step S113 of FIG. 8, the control unit 6 calculates such an evaluation value Vr for the captured image acquired in step S112.

Note that, the method of using the evaluation value Vr as described above is merely an example of the evaluation method regarding the focus blur, and the evaluation method should not be limited to a specific method.

In subsequent step S114, the control unit 6 determines whether or not an image quality condition is satisfied, specifically, whether or not the evaluation value Vr is greater than or equal to a predetermined threshold value THr (whether or not the height of the resolution is greater than or equal to a predetermined height). Here, the determination of whether or not the evaluation value Vr is greater than or equal to the threshold value THr is an example of the determination of whether or not the degree of the focus blur is below a predetermined degree.

In a case where it is determined that the evaluation value Vr THr is not satisfied and the image quality condition is not satisfied, the control unit 6 increments the setting condition identifier M by 1 in step S115, and then returns to step S102. As a result, setting of the candidate parameters in the next setting condition (S102) is performed, and then the processing for determining whether or not the set candidate parameters are appropriate as the evaluation target (S103 to S109) is performed, and if the candidate parameters are determined to be appropriate as the evaluation target, processing for the evaluation regarding the focus blur for the set candidate parameters (S110 to S113) and image quality determination processing based on the evaluation result (S114) are executed.

On the other hand, in a case where the evaluation value Vr z THr is satisfied in step S114 and it is determined that the image quality condition is satisfied, the control unit 6 determines the candidate parameters of the M-th setting condition as use parameters in step S116. That is, the candidate parameters of the M-th setting condition are determined as the adjustment parameters used when the actual image content is superimposed and projected.

The control unit 6 ends a series of processing steps illustrated in FIG. 8 in response to executing the processing of step S116.

Note that, in a case where it is determined in step S114 that the image quality condition is satisfied, the candidate parameters that are the evaluation targets for the determination are already set in each projector device 2. For that reason, it is also possible to proceed to processing for starting the superimposed projection of the actual image content directly without executing the determination processing of step S116.

Here, the determination processing of step S114 corresponds to the fact that determination is performed regarding whether or not the candidate parameters set in step S102 are usable.

With the series of processing steps as described above, as an optical adjustment value of each projector device 2, an adjustment value is found by which a good blur correction effect is obtained by the blur correction processing.

Thus, it is possible to improve blur correction performance in a case where the correction of the focus blur that occurs in the projection image is performed by the signal processing.

Note that, in the above, as the processing of searching the adjustment parameters used for the superimposed projection, an example has been described in which the search is ended in response to discovering the setting condition that satisfies the image quality condition; however, it is also possible to perform determination of the candidate parameters to be used on the basis of a result of relatively evaluating the focus blur for all the M setting conditions prepared in advance. Specifically, in that case, the processing of steps S110 to S113 is executed for the M setting conditions to obtain the evaluation value Vr for each setting condition. Thereafter, the setting condition with the maximum evaluation value Vr, that is, the candidate parameters for each projector device 2 are determined as the optimal candidate parameters. In other words, it is determined as the adjustment parameters used for the superimposed projection of the actual image content.

Note that, even in a case where the determination is performed of the candidate parameters to be used by relatively evaluating the focus blur of the plurality of candidate parameters as described above, it is possible to exclude, from the evaluation target, the setting condition including a combination of the candidate parameters in which the projection range does not satisfy the predetermined range condition and the projector device 2. That is, the processing of steps S102 to S109 can be applied.

[1-5. Modification of Candidate Value Evaluation]

Here, among the plurality of projector devices 2 that perform the superimposed projection, the projector devices 2 whose arrangement positions are close to each other have a tendency that the optical adjustment parameters are similar to each other.

Thus, the projector device 2 arranged adjacent to the projector device 2 that is the target of the evaluation regarding the focus blur in determination of the use parameters can be excluded from the target of the evaluation regarding the focus blur.

Figure 15:
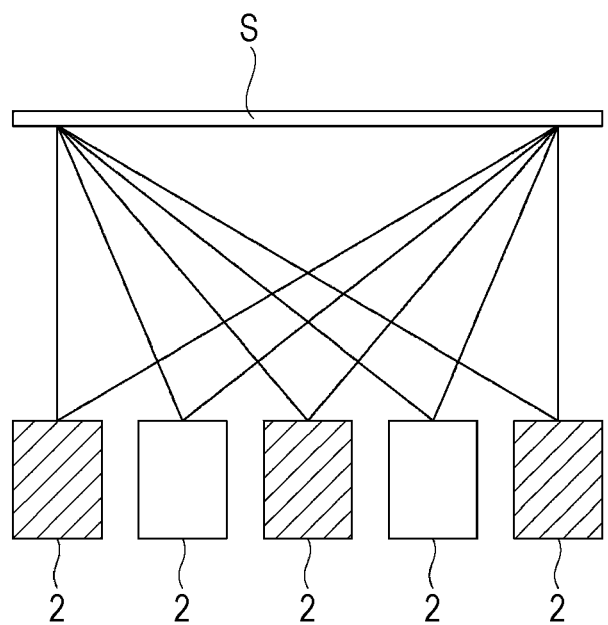
FIG. 15 is an explanatory diagram of a modification of candidate value evaluation.

FIG. 15 illustrates a specific example thereof.

In the figure, a case is exemplified where five projector devices 2 are arranged side by side and the superimposed projection is performed; however, in this case, for example, three projector devices 2 positioned at the hatched center and both left and right ends are targets of focus blur evaluation, and other projector devices 2 are excluded from the targets of the evaluation. That is, the control unit 6 (use determination unit 12) in this case executes the processing illustrated in FIG. 8 only for the three projector devices 2 described above.

In this case, the control unit 6 (use determination unit 12) acquires adjustment parameters for the projector device 2 excluded from the evaluation target (non-target device) on the basis of adjustment parameters used for the projector device 2 positioned closest to the non-target device among the projector devices 2 that are the targets of the evaluation.

As a result, it is enabled to appropriately acquire the adjustment parameters of the projector device 2 excluded from the evaluation target for the adjustment parameter search by using closeness of the adjustment parameters depending on the closeness of the arrangement positions.

Thus, it is possible to achieve both the improvement of the blur correction performance, and reduction of the processing load and shortening of the processing time for that purpose.

In a case where the adjustment parameters of the non-target device are acquired on the basis of the adjustment parameters of the closest projector device 2 as described above, the amount of lens shift of the non-target device is acquired by correcting the amount of lens shift of the closest projector device 2 on the basis of a difference in position from the closest projector device 2.

Here, in the above, among the plurality of projector devices 2 arranged for the superimposed projection, at least the projector device 2 positioned at the center and the projector devices 2 positioned at both ends of the left and right (or up and down in some cases) are the evaluation targets for the adjustment parameter search; however, normally, the projector device 2 at the center is arranged substantially parallel to the projection plane, whereas the projector device 2 at the end tends to be arranged not substantially parallel but obliquely to the projection plane (especially in a case where the number of projector devices 2 arranged is large), and there is a tendency that a relatively large difference occurs in the adjustment parameters between these projector devices 2 at the center and at the end.

Thus, it is desirable that the projector devices 2 excluded from the evaluation target are selected from the projector devices 2 other than at least the projector devices 2 at the center and at the end.

Note that, FIG. 15 illustrates an example in which the arrangement interval, that is, the thinning interval of the projector devices 2 excluded from the evaluation target is set to an interval of every other device; however, the thinning interval is not limited to the interval of every other device, and can be set every plural devices. Furthermore, the thinning interval is not limited to be constant, and, for example, in a case where a large number of projector devices 2 such as several tens are used, the thinning interval can be gradually reduced from the center to the end side.

Furthermore, for some of the projector devices 2 that perform the superimposed projection, the same candidate parameters as those of the other projector device 2 (for example, the closest projector device 2) may be set to perform the evaluation regarding the focus blur.

As a result, it becomes unnecessary to store the candidate parameters for all the projector devices 2 as the table information indicated in FIG. 9, and the capacity of the table information can be reduced.

2. Second Embodiment

[2-1. Configurations of Image Projection Device and Image Processing Device as Second Embodiment]

Subsequently, a second embodiment will be described.

The second embodiment re-searches for the adjustment parameters depending on a temperature of the image projection device. Note that, in the following description, portions similar to those already described are designated by the same reference numerals and the description thereof will be omitted.

Figure 16:
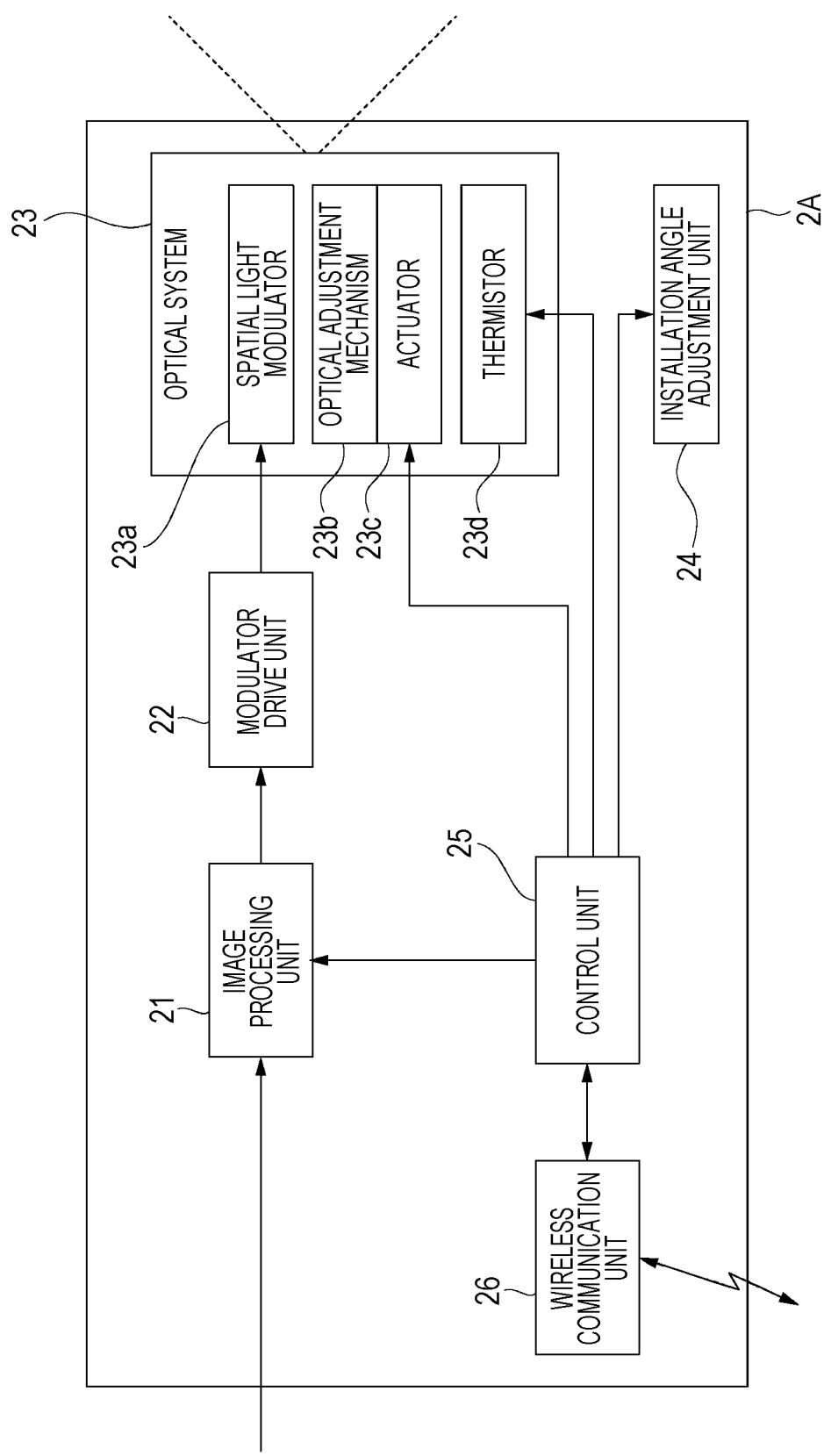
FIG. 16 is a block diagram illustrating an internal configuration example of an image projection device in a second embodiment.

FIG. 16 is a block diagram illustrating an example of an internal configuration example of the projector device 2 used in the second embodiment.

A difference from the projector device 2 of the first embodiment is that a thermistor 23d for performing temperature detection is added. In the present example, the thermistor 23d is arranged at a predetermined position in the optical system 23, and is enabled to detect a temperature of the optical system 23.

The thermistor 23d is connected to the control unit 25, and the control unit 25 is enabled to acquire temperature information detected by the thermistor 23d.

Figure 17:
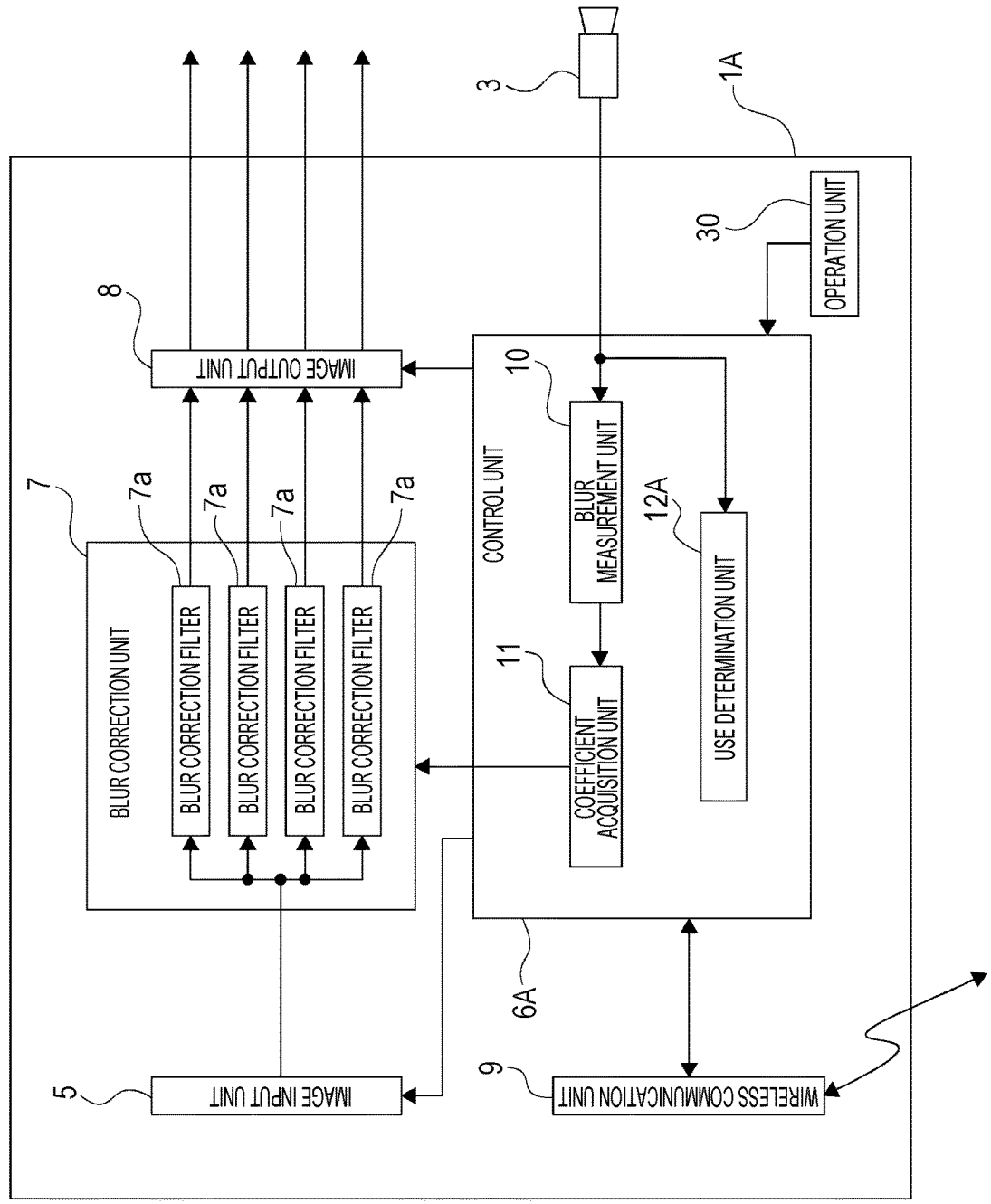
FIG. 17 is a block diagram for explaining a configuration example of an image processing device of the second embodiment.

FIG. 17 is a diagram for explaining an internal configuration example of an image processing device 1A as the second embodiment, and also illustrates the imaging device 3 together with the internal configuration example of the image processing device 1A.

A difference from the image processing device 1 is that a control unit 6A is provided instead of the control unit 6 and an operation unit 30 is further provided.

The control unit 6A is different from the control unit 6 in that a use determination unit 12A is provided instead of the use determination unit 12.

The operation unit 30 comprehensively represents an operation input device for a user to perform an operation input to the image processing device 1A, and outputs operation information depending on the operation input of the user to the control unit 6A. Examples of the operation unit 6A include various button operation elements, touch sensors, and the like. Alternatively, the user operation input can be performed via a remote controller, and in that case, the operation unit 30 includes a reception unit that receives a transmission signal by the remote controller.

In the control unit 6A, after executing the adjustment parameter search processing (calibration) described in the first embodiment, the use determination unit 12A executes the adjustment parameter search processing again on the basis of a temperature detection result of the thermistor 23d in a projector device 2A.

[2-2. Processing Procedure]

Figure 18:
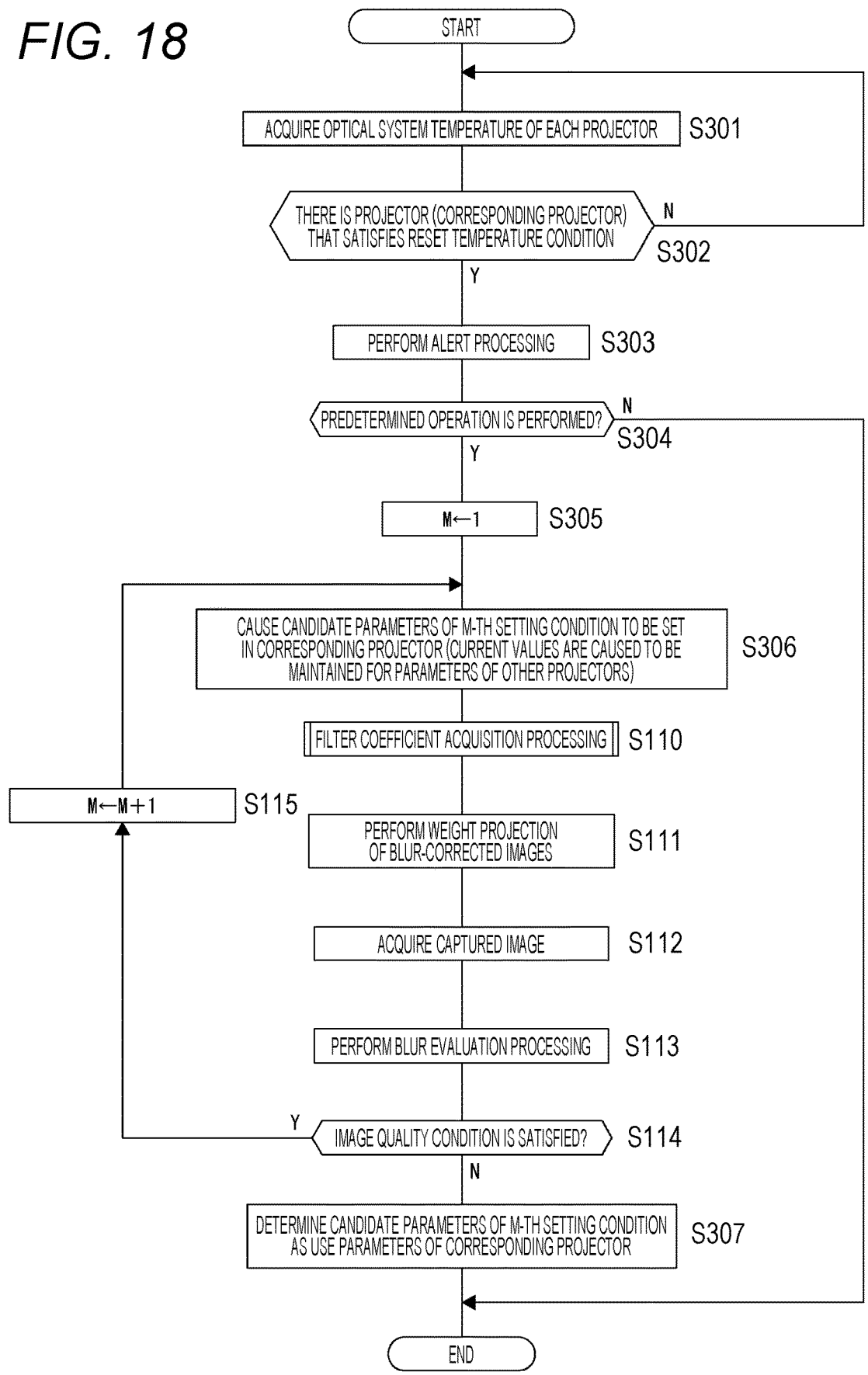
FIG. 18 is a flowchart illustrating a specific processing procedure to be executed to implement an adjustment parameter search method as the second embodiment.

FIG. 18 is a flowchart illustrating a specific processing procedure to be executed by the CPU of the control unit 6A to implement an adjustment parameter search method as the second embodiment. The processing illustrated in FIG. 18 is started at a predetermined timing after execution of the search processing as the calibration exemplified in FIG. 8.

First, in step S301, the control unit 6A acquires an optical system temperature of each projector device 2A. That is, the control unit 25 in the projector device 2A is caused to acquire the temperature information detected by the thermistor 23d, and the temperature information is acquired via the wireless communication unit 26 and the wireless communication unit 9.

In subsequent step S302, the control unit 6A determines whether or not there is the projector device 2A that satisfies a reset temperature condition. Here, in the present example, the reset temperature condition is defined that the acquired optical system temperature is greater than or equal to a predetermined threshold value THt.

In a case where it is determined that there is no projector device 2A (hereinafter referred to as a "corresponding projector") that satisfies the reset temperature condition, the control unit 6A returns to step S301.

On the other hand, in a case where it is determined that there is the corresponding projector, the control unit 6A causes each projector device 2A to execute an alert display indicating that re-search for the adjustment parameter is to be performed as alert processing in step S303. As the alert display, for example, image information is caused to be displayed that includes message information asking whether or not to re-search for the adjustment parameters and icons representing "yes" and "no" selection buttons.

After the calibration, since there is a case where each projector device 2A is superimposing and projecting the actual image content, the alert processing as described above is executed to ask the user whether or not to execute the re-search. Note that, it is not essential to determine whether or not to perform the re-search on the basis of the user operation.

In subsequent step S304, the control unit 6A determines whether or not a predetermined operation is performed. Specifically, in the present example, it is determined whether or not an operation of selecting "Yes" described above is performed within a predetermined time.

In a case where the predetermined operation is not performed, that is, the operation of selecting "Yes" is not performed within the predetermined time, or an operation of selecting "No" is performed, the control unit 6A ends a series of processing steps illustrated in the figure. That is, the re-search for the adjustment parameter is not executed.

On the other hand, in a case where the predetermined operation is performed, the control unit 6A executes the processing of step S305 and subsequent steps to execute processing for re-searching for the adjustment parameters for the corresponding projector.

First, the control unit 6A sets the setting condition identifier M to "1" in step S305, and executes processing of causing the candidate parameters of the M-th setting condition to be set in the corresponding projector in step S306. At this time, for the projector device 2A other than the corresponding projector, a setting state of the adjustment parameters until then is caused to be maintained.

Then, the control unit 6A executes the processing of steps S110 to S114 described in FIG. 8 in response to executing the setting processing of step S306. As a result, the filter coefficients w (the filter coefficients w of the respective representative points of each projector device 2A) are obtained that minimize the focus blur in a state where the candidate parameters in the M-th setting condition are set in the corresponding projector (S110), and also the evaluation regarding the focus blur is performed for the superimposed projection image in a case where the blur correction processing is performed using those filter coefficients w (S111 to S113), and it is determined whether or not the image quality condition is satisfied (S114).

In a case where it is determined in step S114 that the image quality condition is not satisfied, the control unit 6A increments the setting condition identifier M by 1 in step S115, and then returns to step S306. As a result, in a case where the candidate parameters of the next setting condition are set in the corresponding projector, the filter coefficients w are obtained that minimize the focus blur, and also it is determined whether or not the image quality condition is satisfied for the superimposed projection image in a case where the blur correction processing using the filter coefficients w is performed.

On the other hand, in a case where it is determined in step S114 that the image quality condition is satisfied, the control unit 6A proceeds to step S307, determines the candidate parameters of the M-th setting condition as use parameters of the corresponding projector, and ends the series of processing steps illustrated in FIG. 18.

Note that, also in this case, it is not essential to perform the processing of determining the use parameter.

When the temperature of the optical system 23 of the projector device 2A (in particular, a temperature of the projection lens) changes, the blur characteristic of the focus also changes. In particular, in a case where a glass lens is used as the projection lens, the change in the blur characteristic is relatively large.

By performing the re-search as described above, it is possible to prevent image quality degradation due to the temperature change.

Note that, in the above, an example has been described in which all the candidate parameters prepared in advance are the evaluation targets for the corresponding projector; however, it is also possible that only some of the candidate parameters are the evaluation targets. For example, it is also possible that the candidate parameters that are evaluation targets can be selectable by the user operation. Alternatively, it is also conceivable that, for example, a candidate parameter having a large difference from the adjustment parameter being set (for example, the difference is greater than or equal to a threshold value) is excluded from the evaluation target, in other words, the search range is limited to the vicinity of the adjustment parameter being set.

Furthermore, in the above, an example has been described in which the projector device 2A whose temperature is greater than or equal to the predetermined value is a target of the re-search; however, it is also possible that the target of the re-search is the projector device 2A in which a ratio of the temperature to the total temperature of all the projector devices 2A is large.

Alternatively, it is also possible that the re-search is not performed in a case where the evaluation regarding the focus blur of the superimposed projection image is good even if the temperature is greater than or equal to the predetermined value.

Execution conditions of the re-search based on the temperature as described above are not limited to those exemplified above, and are variously conceivable.

Furthermore, also at the time of re-search, the projection range of the projection image in a state where the candidate parameters are set is evaluated by the processing similar to steps S104 to S107 above, and in a case where the projection range does not satisfy the predetermined range condition, it is also possible to exclude the candidate parameters from the evaluation targets regarding the focus blur.

3. Modifications

Note that, the present technology is not limited to the specific examples described above, and various modifications are conceivable.

For example, in the above, an example has been described in which the image processing device 1 (or 1A) acquires the filter coefficient w for the blur correction by calculation using the predetermined derivation formula; however, it is also possible to obtain the filter coefficient w from table information in which the corresponding filter coefficient w is associated for each combination of the blur characteristics. Specifically, it is a configuration in which the table information that stores the corresponding filter coefficient w is caused to be stored in the image processing device 1 (1A), for each combination that is assumed, as a combination of the blur characteristics for each image area of each projector device 2 (or 2A), and the filter coefficient w is acquired on the basis of the table information and the blur characteristic for each image area measured on the basis of the captured image of the imaging device 3.

In this case, the coefficient acquisition unit 11 is only required to specify a combination that matches the combination of the blur characteristics measured, among the combinations of the blur characteristics in the table information, and acquire the filter coefficient w based on the specified combination.

Furthermore, in the above, an example has been described in which as the blur correction processing using the filter designed by the inverse function of the blur, the processing is performed using the filter coefficient w obtained by the derivation formula in which the blur characteristics of the respective projector devices 2 (2A) are collectively incorporated in one set as indicated in [Formula 5]; however, it is also possible to perform the blur correction processing using the filter coefficient w obtained by the method described as the preceding example (see [Formula 3] and [Formula 4]).

Alternatively, the blur correction processing is not limited to the processing using the filter coefficient w obtained from the derivation formula, and it is also possible to perform the processing by another method such as using the filter coefficient obtained by the feedback type correction technology disclosed in Patent Document 1 described above, for example.

Furthermore, although not particularly described above, it is also possible to devise the order of the candidate parameters that are evaluation target. For example, for the projector device 2 (2A) having a large installation angle with respect to the projection plane (having a large rotation angle in the pan or tilt direction), it is conceivable that the evaluation target is set in order from the one having a larger value among the candidate parameters prepared in advance. As a result, corresponding to a case where the method (see step S114) is adopted in which the search is ended in response to discovering the candidate parameters satisfying the image quality condition (the degree of the focus blur is below the predetermined degree), it is possible to reduce the processing time and the processing load required for the search for the adjustment parameters.

Furthermore, in the above, an example has been described in which the spatial light modulator 23a included in the projector device 2 (2A) is a transmissive liquid crystal panel; however, a reflective liquid crystal panel, a Digital Micromirror Device (DMD), or the like can also be used as the spatial light modulator 23a, and the device is not limited to the transmissive liquid crystal panel.

Furthermore, in the first and second embodiments, an example has been described in which the image processing device (1 or 1A) as the embodiment is provided separately from the projector device 2; however, the image processing device can also be integrated with any projector device 2.

4. Summary of Embodiments

As described above, the image processing device of the embodiment (the image processing device 1 or 1A) includes: the blur correction unit (the blur correction unit 7) that performs the blur correction processing for the focus blur correction on the input image on the basis of the blur characteristic that is the characteristic of the focus blur that occurs in the projection image of the image projection device (the projector device 2 or 2A), the blur characteristic being measured in the state where the predetermined candidate value (candidate parameter) is set as the optical adjustment value (adjustment parameter) of the image projection device; and the use determination unit (the use determination unit 12 or 12A) that performs the evaluation regarding the focus blur on the projection image obtained by causing the image projection device to project the image subjected to the blur correction processing, and performs the determination regarding whether or not the candidate value is usable on the basis of the result of the evaluation.

As a result, it is enabled to search for an adjustment value with which a good blur correction effect is obtained by the blur correction processing as the optical adjustment value of the image projection device.

Thus, it is possible to improve blur correction performance in a case where the correction of the focus blur that occurs in the projection image is performed by the signal processing.

Furthermore, in the image processing device as the embodiment, the blur correction unit, on the basis of the blur characteristic of each of the plurality of image projection devices, the blur characteristic being measured when the image projection is individually performed in the state where the candidate value corresponding to each of the image projection devices is set, obtains the blur-corrected images of the respective image projection devices by performing the blur correction processing for each of the image projection devices on the input image; and the use determination unit performs the evaluation regarding the focus blur on the superimposed projection image obtained by causing the plurality of image projection devices to superimpose and project the blur-corrected images, and performs the determination on the basis of the result of the evaluation.

As a result, it is enabled to search for an adjustment value with which a good blur correction effect is obtained by the blur correction processing as the optical adjustment value of each of the image projection devices that perform the superimposed projection.

Thus, it is possible to improve the blur correction performance for the focus blur that occurs in the superimposed projection image.

Moreover, in the image processing device as the embodiment, the blur correction unit performs the blur correction processing for each of the image projection devices on the basis of the filter coefficient for each of the image projection devices, the filter coefficient being obtained by the derivation formula from which the filter coefficient for the blur correction corresponding to each of the image projection devices is derived and in which the blur characteristic for each of the image projection devices is collectively incorporated in one set.

By solving the derivation formula in which the blur characteristics of the respective image projection devices are collectively incorporated as described above, the correction filter coefficient for each of the image projection devices can converge not only to have a tendency that the blur itself is canceled out (that is, a tendency that an enhancement in a direction in which the blur is large is increased), but also to have a tendency that the enhancement in the direction in which the blur is large is decreased and an enhancement in a direction in which the blur is small is increased.

Thus, it is possible to further improve the blur correction performance for the focus blur that occurs in the superimposed projection image.

Furthermore, in the image processing device as the embodiment, the use determination unit causes the image projection device in the state where the candidate value is set to project the predetermined image to evaluate the projection range of the predetermined image, and in the case where the projection range does not satisfy the predetermined range condition, excludes the combination of the candidate value and the image projection device from the target of the evaluation regarding the focus blur.

For example, in a case where a swing width of the candidate value is increased to widen a search range for obtaining an optimal point of the adjustment value, there may be a case where the image projection range does not satisfy the predetermined range condition, for example, the projection range of the image largely deviates from a specified projection range in a combination of a certain candidate value and the image projection device, and the like. Since the fact that the image projection range does not satisfy the predetermined range condition is a problem before image quality improvement, the combination of these candidate value and image projection device is excluded from an evaluation target of the focus blur in an adjustment value search.

As a result, for the combination of the candidate values considered unnecessary and the image projection device, it is enabled to prevent the measurement of the blur characteristic by the blur measurement unit, the blur correction processing by the blur correction unit, and the evaluation regarding the focus blur by the adjustment value determination unit from being performed, and it is possible to achieve reduction of the processing load and shortening of the processing time required for optimizing the adjustment value.

Furthermore, in the image processing device as the embodiment, the use determination unit excludes the image projection device arranged adjacent to the image projection device that is the target of the evaluation regarding the focus blur from the target of the evaluation regarding the focus blur.

The image projection devices whose arrangement positions are close to each other have a tendency that close values are set as the adjustment values, for example, a pan or tilt angle, an amount of lens shift, and the like. Thus, the image projection device arranged adjacent to the image projection device that is the target of the evaluation regarding the focus blur for determining the adjustment value is thinned out from the target of the evaluation, whereby the number of pieces of processing for the adjustment value search is reduced.

Thus, reduction of the processing load and shortening of the processing time for optimizing the adjustment value can be achieved.

Moreover, in the image processing device as the embodiment, the use determination unit acquires the adjustment value for the non-target device that is the image projection device excluded from the target of the evaluation, on the basis of the adjustment value used for the image projection device positioned closest to the non-target device among the image projection devices that are the targets for the evaluation.

As a result, it is enabled to appropriately acquire the adjustment value of the image projection device excluded from the evaluation target for the adjustment value search by using closeness of the adjustment values depending on closeness of the arrangement positions.

Thus, it is possible to achieve both the improvement of the blur correction performance, and reduction of the processing load and shortening of the processing time for that purpose.

Furthermore, in the image processing device as the embodiment, the adjustment value includes the adjustment value regarding the rotation angle in the pan or tilt direction of the image projection device.

The rotation angle in the pan or tilt direction of the image projection device is one of factors that change the characteristic of the focus blur that occurs in the projection image.

Thus, the blur correction performance can be improved by optimizing the adjustment value regarding the rotation angle in the pan or tilt direction.

Furthermore, in the image processing device as the embodiment, the adjustment value includes the adjustment value regarding the amount of lens shift of the image projection device.

The amount of lens shift of the image projection device is one of the factors that change the characteristic of the focus blur that occurs in the projection image.

Thus, the blur correction performance can be improved by optimizing the adjustment value regarding the amount of lens shift.

Moreover, in the image processing device as the embodiment, the adjustment value includes the adjustment value regarding the focus position of the image projection device.

The focus position of the image projection device is one of the factors that change the characteristic of the focus blur that occurs in the projection image.

Thus, the blur correction performance can be improved by optimizing the adjustment value regarding the focus position.

Furthermore, in the image processing device as the embodiment, the use determination unit determines whether or not the candidate value is usable by determining whether or not the degree of the focus blur is below the predetermined degree on the basis of the result of the evaluation regarding the focus blur.

As a result, it is enabled to search for a candidate value that gives the best evaluation result among the plurality of candidate values as the adjustment value to be used.

Thus, the blur correction performance can be maximized.

Furthermore, in the image processing device as the embodiment, the use determination unit performs the determination of the candidate value to be used on the basis of the result of relatively evaluating the focus blur for the plurality of candidate values.

As a result, it is enabled to search for a candidate value that gives the best evaluation result among the plurality of candidate values as the adjustment value to be used.

Thus, the blur correction performance can be maximized.

Moreover, in the image processing device as the embodiment, the use determination unit (the use determination unit 12A) re-executes the evaluation regarding the focus blur targeted for the image projection device on the basis of the temperature detection result by the temperature detection unit (the thermistor 23d) that detects the temperature of the image projection device, and re-executes the determination on the basis of the result of the evaluation re-executed.

As a result, it is enabled to re-search for the adjustment value corresponding to the case where the optimal adjustment value changes depending on the temperature.

Thus, it is possible to prevent image quality degradation due to the temperature change.

Furthermore, the image processing method as the embodiment includes: the blur correction procedure of performing the blur correction processing for the focus blur correction on the input image on the basis of the blur characteristic that is the characteristic of the focus blur that occurs in the projection image of the image projection device (the projector device 2 or 2A), the blur characteristic being measured in the state where the predetermined candidate value (candidate parameter) is set as the optical adjustment value (adjustment parameter) of the image projection device; and the use determination procedure of performing the evaluation regarding the focus blur on the projection image obtained by causing the image projection device to project the image subjected to the blur correction processing, and performing the determination regarding whether or not the candidate value is usable on the basis of the result of the evaluation.

With such an image processing method as the embodiment, it is also possible to obtain a function and an effect similar to those of the image processing device as the embodiment described above.

Note that, the advantageous effects described in the specification are merely examples, and the advantageous effects of the present technology are not limited to them and may include other effects.

5. Present Technology

Note that, the present technology can also be configured as described below.

(1)
Image processing device including:
a blur correction unit that performs blur correction processing for focus blur correction on an input image on the basis of a blur characteristic that is a characteristic of a focus blur that occurs in a projection image of an image projection device, the blur characteristic being measured in a state where a predetermined candidate value is set as an optical adjustment value of the image projection device; and
a use determination unit that performs evaluation regarding the focus blur on a projection image obtained by causing the image projection device to project an image subjected to the blur correction processing, and performs determination regarding whether or not the candidate value is usable on the basis of a result of the evaluation.

(2)
The image processing device according to (1), in which the blur correction unit,
on the basis of a blur characteristic of each of a plurality of the image projection devices, the blur characteristic being measured when image projection is individually performed in a state where the candidate value corresponding to each of the image projection devices is set, obtains blur-corrected images of the respective image projection devices by performing the blur correction processing for each of the image projection devices on the input image, and
the use determination unit
performs the evaluation regarding the focus blur on a superimposed projection image obtained by causing the plurality of image projection devices to superimpose and project the blur-corrected images, and performs the determination on the basis of a result of the evaluation.

(3)
The image processing device according to (2), in which the blur correction unit
performs the blur correction processing for each of the image projection devices on the basis of a filter coefficient for each of the image projection devices, the filter coefficient being obtained by a derivation formula from which the filter coefficient for blur correction corresponding to each of the image projection devices is derived and in which the blur characteristic for each of the image projection devices is collectively incorporated in one set.

(4)
The image processing device according to any of (1) to (3), in which
the use determination unit
causes the image projection device in a state where the candidate value is set to project a predetermined image to evaluate a projection range of the predetermined image, and in a case where the projection range does not satisfy a predetermined range condition, excludes a combination of the candidate value and the image projection device from a target of the evaluation regarding the focus blur.

(5)
The image processing device according to (2) or (3), in which
the use determination unit
excludes the image projection device arranged adjacent to the image projection device that is a target of the evaluation regarding the focus blur from the target of the evaluation regarding the focus blur.

(6)
The image processing device according to (5), in which
the use determination unit
acquires the adjustment value for a non-target device that is the image projection device excluded from the target of the evaluation, on the basis of the adjustment value used for the image projection device positioned closest to the non-target device among the image projection devices that are targets for the evaluation.

(7)
The image processing device according to any of (1) to (6), in which
the adjustment value includes an adjustment value regarding a rotation angle in a pan or tilt direction of the image projection device.

(8)
The image processing device according to any of (1) to (7), in which
the adjustment value includes an adjustment value regarding an amount of lens shift of the image projection device.

(9)
The image processing device according to any of (1) to (8), in which
the adjustment value includes an adjustment value regarding a focus position of the image projection device.

(10)
The image processing device according to any of (1) to (9), in which
the use determination unit
determines whether or not the candidate value is usable by determining whether or not a degree of the focus blur is below a predetermined degree on the basis of a result of the evaluation regarding the focus blur.

(11)
The image processing device according to any of (1) to (9), in which
the use determination unit
performs determination of the candidate value to be used on the basis of a result of relatively evaluating the focus blur for a plurality of the candidate values.

(12)
The image processing device according to any of (1) to (11), in which
the use determination unit
re-executes evaluation targeted for the image projection device and regarding the focus blur on the basis of a temperature detection result by a temperature detection unit that detects a temperature of the image projection device, and re-executes the determination on the basis of a result of the evaluation re-executed.

REFERENCE SIGNS LIST 1, 1A Image processing device
2, 2A Projector device

3 Imaging device
5 Image input unit
6, 6A Control unit
7 Blur correction unit
7a Blur correction filter
8 Image output unit
9 Wireless communication unit
10 Blur measurement unit
11 Coefficient acquisition unit
12, 12A Use determination unit
21 Image processing unit
22 Modulator drive unit
23 Optical system
23a Spatial light modulator
23b Optical adjustment mechanism
23c Actuator
23d Thermistor
24 Installation angle adjustment unit
25 Control unit
26 Wireless communication unit
30 Operation unit
S Screen
Pp Superimposed projection image

The invention claimed is:

1. An image processing device comprising:
a blur correction unit configured to perform blur correction processing for focus blur correction on an input image on a basis of a blur characteristic that is a characteristic of a focus blur that occurs in a projection image of an image projection device, the blur characteristic being measured on a basis of a predetermined candidate value being set as an adjustment value of the image projection device; and
a use determination unit configured to
perform evaluation regarding the focus blur on a projection image obtained by causing the image projection device to project an image subjected to the blur correction processing, and
perform determination regarding whether or not the candidate value is excluded from a target of the evaluation regarding the focus blur on a basis of a result of the evaluation,
wherein the blue correction unit and the use determination unit are each implemented via at least one processor.

2. The image processing device according to claim 1, wherein
the blur correction unit is further configured to obtain, on a basis of a blur characteristic of each image projection device of a plurality of the image projection devices, the blur characteristic being measured when image projection is individually performed on a basis of the candidate value corresponding to each of the image projection devices being set, blur-corrected images of respective image projection devices by performing the blur correction processing for each of the image projection devices on the input image, and
the use determination unit is further configured to
perform the evaluation regarding the focus blur on a superimposed projection image obtained by causing the plurality of image projection devices to superimpose and project the blur-corrected images, and
perform the determination on a basis of a result of the evaluation.

3. The image processing device according to claim 2, wherein
the blur correction unit is further configured to perform the blur correction processing for each of the image projection devices on a basis of a filter coefficient for each of the image projection devices, the filter coefficient being obtained by a derivation formula from which the filter coefficient for blur correction corresponding to each of the image projection devices is derived and in which the blur characteristic for each of the image projection devices is collectively incorporated in one set.

4. The image processing device according to claim 1, wherein
the use determination unit is further configured to
cause the image projection device, on a basis of the candidate value being set to project a predetermined image, to evaluate a projection range of the predetermined image, and
exclude, on a basis of the projection range not satisfying a predetermined range condition, the candidate value and the image projection device from a target of the evaluation regarding the focus blur.

5. The image processing device according to claim 2, wherein
the use determination unit is further configured to exclude the image projection device arranged adjacent to the image projection device that is a target of the evaluation regarding the focus blur from the target of the evaluation regarding the focus blur.

6. The image processing device according to claim 5, wherein
the use determination unit is further configured to acquire the adjustment value for a non-target device that is the image projection device excluded from the target of the evaluation, on a basis of the adjustment value used for the image projection device positioned closest to the non-target device among the image projection devices that are targets for the evaluation.

7. The image processing device according to claim 1, wherein
the adjustment value includes an adjustment value regarding a rotation angle in a pan or tilt direction of the image projection device.

8. The image processing device according to claim 1, wherein
the adjustment value includes an adjustment value regarding an amount of lens shift of the image projection device.

9. The image processing device according to claim 1, wherein
the adjustment value includes an adjustment value regarding a focus position of the image projection device.

10. The image processing device according to claim 1, wherein
the use determination unit is further configured to determine whether or not the candidate value is usable by determining whether or not a degree of the focus blur is below a predetermined degree on a basis of a result of the evaluation regarding the focus blur.

11. The image processing device according to claim 1, wherein
the use determination unit is further configured to perform determination of the candidate value to be used on a basis of a result of evaluating the focus blur for a plurality of the candidate values.

12. The image processing device according to claim 1, wherein
the use determination unit is further configured to
re-execute evaluation targeted for the image projection device and regarding the focus blur on a basis of a temperature detection result by a temperature detection unit configured to detect a temperature of the image projection device, and re-execute the determination on a basis of a result of the re-executed evaluation, wherein the temperature detection unit is implemented via at least one processor.

13. Image processing method comprising:

performing blur correction processing for focus blur correction on an input image on a basis of a blur characteristic that is a characteristic of a focus blur that occurs in a projection image of an image projection device, the blur characteristic being measured on a basis of a predetermined candidate value being set as an optical adjustment value of the image projection device;

performing evaluation regarding the focus blur on a projection image obtained by causing the image projection device to project an image subjected to the blur correction processing; and performing determination regarding whether or not the candidate value is excluded from a target of the evaluation regarding the focus blur on a basis of a result of the evaluation.

14. A non-transitory computer-readable medium having embodied thereon a program, which when executed by a computer causes the computer to execute an image processing method, the method comprising:

performing blur correction processing for focus blur correction on an input image on a basis of a blur characteristic that is a characteristic of a focus blur that occurs in a projection image of an image projection device, the blur characteristic being measured on a basis of a predetermined candidate value being set as an optical adjustment value of the image projection device;

performing evaluation regarding the focus blur on a projection image obtained by causing the image projection device to project an image subjected to the blur correction processing; and performing determination regarding whether or not the candidate value is excluded from a target of the evaluation regarding the focus blur on a basis of a result of the evaluation.

* * * * *